US012681341B2

(12) United States Patent
Miyazaki et al.

(10) Patent No.: US 12,681,341 B2
(45) Date of Patent: Jul. 14, 2026

(54) OPTICAL WAVEGUIDE ELEMENT, OPTICAL MODULATOR, OPTICAL MODULATION MODULE, AND OPTICAL TRANSMISSION DEVICE

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 323 days.

(21) Appl. No.: 18/245,977

(22) PCT Filed: Sep. 24, 2021

(86) PCT No.: PCT/JP2021/035136
§ 371 (c)(1),
(2) Date: Mar. 20, 2023

(87) PCT Pub. No.: WO2022/065440
PCT Pub. Date: Mar. 31, 2022

(65) Prior Publication Data
US 2023/0367147 A1 Nov. 16, 2023

(30) Foreign Application Priority Data
Sep. 25, 2020 (JP) ................................. 2020-160537

(51) Int. Cl.
*G02F 1/035* (2006.01)

(52) U.S. Cl.
CPC ...... *G02F 1/0356* (2013.01); *G02F 2201/063* (2013.01); *G02F 2202/20* (2013.01)

(58) Field of Classification Search
CPC ............. G02F 1/0356; G02F 2201/063; G02F 2202/20
See application file for complete search history.

(56) References Cited

U.S. PATENT DOCUMENTS

2012/0314725 A1* 12/2012 Nakanishi ............... G02F 1/025
385/14
2014/0093202 A1* 4/2014 Miyazaki ................ G02F 1/035
385/2
(Continued)

FOREIGN PATENT DOCUMENTS

CN 102224444 B * 5/2015 ............. G02F 1/225
CN 105074547 B * 8/2018 ........... G02F 1/0316
(Continued)

OTHER PUBLICATIONS

CN_102224444_B (English Translation) (Year: 2015).*
(Continued)

*Primary Examiner* — Thomas A Hollweg
*Assistant Examiner* — Mary A El-Shammaa
(74) *Attorney, Agent, or Firm* — Rankin, Hill & Clark LLP

(57) ABSTRACT

The optical absorption loss of the optical waveguide and the signal propagation loss of the high-frequency signal electrode are both reduced at a plurality of intersections between the convex optical waveguide and the high-frequency signal electrode, thereby achieving good operating characteristics. An optical waveguide device includes a substrate on which optical waveguides are formed, and an electrode that is formed on the substrate and has intersections crossing over the optical waveguides, in which the optical waveguides are configured by protruding portions extending on the substrate, and an intermediate layer made of a resin is provided at the adjacent intersections along the electrode to fill spaces between the protruding portions along the electrode and covers top of the protruding portions.

13 Claims, 14 Drawing Sheets

SECOND MODIFICATION EXAMPLE OF PART B

(56) References Cited

U.S. PATENT DOCUMENTS

| | | | |
|---|---|---|---|
| 2015/0023627 A1 | 1/2015 | Kimura et al. | |
| 2016/0011439 A1* | 1/2016 | Kitamura | G02F 1/218 |
| | | | 438/31 |
| 2017/0075188 A1* | 3/2017 | Nakata | G02F 1/2255 |
| 2019/0049756 A1* | 2/2019 | Miyazaki | G02F 1/0123 |
| 2022/0163720 A1* | 5/2022 | Kugimoto | G02F 1/0356 |
| 2024/0152021 A1* | 5/2024 | Miyazaki | G02F 1/2255 |
| 2024/0210784 A1* | 6/2024 | Hayami | G02F 1/212 |

FOREIGN PATENT DOCUMENTS

| | | | | |
|---|---|---|---|---|
| JP | 2001-127377 A | | 5/2001 | |
| JP | 2007-264548 A | | 10/2007 | |
| JP | 2009-181108 A | | 8/2009 | |
| JP | 2014167567 A | * | 9/2014 | G02B 6/13 |
| JP | 2015-021974 A | | 2/2015 | |
| JP | 2016029469 A | * | 3/2016 | G02F 1/025 |
| JP | 2020-112745 A | | 7/2020 | |
| JP | 2020134876 A | * | 8/2020 | G02F 1/225 |
| WO | WO-2015012093 A1 | * | 1/2015 | H10K 50/854 |
| WO | 2018/031916 A1 | | 2/2018 | |
| WO | WO-2019026943 A1 | * | 2/2019 | G02F 1/025 |

OTHER PUBLICATIONS

CN_105074547_B (English Translation) (Year: 2018).*
JP_2014167567_A (English Translation) (Year: 2014).*
JP_2016029469_A (English Translation) (Year: 2016).*
JP_2020134876_A (English Translation) (Year: 2020).*
WO_2015012093_A1 (English Translation) (Year: 2015).*
WO_2019026943_A1 (English Translation) (Year: 2019).*
International Search Report, International Application No. PCT/JP2021/035136, Date of mailing: Dec. 7, 2021, 2 pages.

* cited by examiner

PART A DETAILED

PART B DETAILED

PART B DETAILED
    V-V CROSS SECTION

FIRST MODIFICATION EXAMPLE OF PART B

SECOND MODIFICATION EXAMPLE OF PART B

THIRD MODIFICATION EXAMPLE OF PART B

FOURTH MODIFICATION EXAMPLE OF PART B

PART C DETAILED
XI-XI CROSS SECTION

OPTICAL WAVEGUIDE ELEMENT, OPTICAL MODULATOR, OPTICAL MODULATION MODULE, AND OPTICAL TRANSMISSION DEVICE

TECHNICAL FIELD

The present invention relates to an optical waveguide device, an optical modulator, an optical modulation module, and an optical transmission apparatus.

BACKGROUND ART

In a high-frequency and large-capacity optical fiber communication system, an optical modulator incorporating an optical modulation device as an optical waveguide device including an optical waveguide formed on a substrate and a control electrode for controlling a light wave propagating in the optical waveguide is often used. Among these, optical modulation devices in which $LiNbO_3$ (hereinafter, also referred to as LN) having an electro-optic effect is used for substrates has a small optical loss and can realize a wide band optical modulation characteristic, so the optical modulation devices are widely used for high-frequency/large-capacity optical fiber communication systems.

In particular, due to the increasing transmission capacity in recent years, the mainstream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

Further, in recent years, for low-voltage driving and high-frequency modulation of the optical modulator itself, optical modulators using a rib-type optical waveguide or ridge optical waveguide (hereinafter collectively referred to as convex optical waveguides) formed by forming strip-shaped protruding portions on the surface of a thinned LN substrate (for example, a thickness of 20 μm or less) to further strengthen the interaction between the signal electric field and the guided light in the substrate are also being put to practical use (for example, Patent Literature No. 1 and No. 2).

An optical modulator that performs QPSK modulation (QPSK optical modulator) and an optical modulator that performs DP-QPSK modulation (DP-QPSK optical modulator) each include a plurality of Mach-Zehnder optical waveguides in a nest structure called so-called nested type, each of which includes at least one high-frequency signal electrode. Further, in an optical modulator using such a Mach-Zehnder optical waveguide, bias electrodes for compensating for fluctuations in the bias points due to so-called DC drift are also generally formed.

These high-frequency signal electrodes and bias electrodes (hereinafter, also collectively referred to as simply electrodes) are formed so as to extend to the vicinity of the outer periphery of the LN substrate for connection with an electric circuit outside the substrate. Therefore, on the substrate, the plurality of optical waveguides and the plurality of electrodes intersect in a complicated manner, and a plurality of intersections where the electrodes traverse the optical waveguides are formed.

When the optical waveguides and the electrodes are formed so as to be in direct contact with each other at the intersections, the light propagating through the optical waveguides is absorbed by the metal configuring the electrodes at these intersections, resulting in an optical loss (optical absorption loss). Further, when the convex optical waveguide and the high-frequency signal electrode for propagating a high-frequency electrical signal intersect, unevenness along the cross-sectional shape of the convex optical waveguide is generated in the upper and lower surfaces of the high-frequency signal electrode on the substrate, at the intersection, and a high-frequency electrical signal leaks from the edge portion of the unevenness due to radiation or the like, thereby increasing the signal propagation loss in the high-frequency signal electrode. In particular, in an optical modulation device that achieves a modulation speed exceeding 100 G, the high-frequency electrical signal propagated by the high-frequency signal electrode becomes a signal of microwave frequency and propagates near the surface of the high-frequency signal electrode due to the skin effect, so that the high-frequency electrical signal is susceptible to adverse effects (propagation loss, or the like) due to unevenness on the surface.

Then, the optical loss and the signal propagation loss can, for example, create an optical loss difference between the two parallel waveguides configuring the Mach-Zehnder optical waveguide and deteriorate the extinction ratio of the modulated light. Since the required conditions for the extinction ratio are more severe as the modulation speed required for the optical modulator is higher, the deterioration of the extinction ratio is expected to become more apparent as the modulation speed increases with the increase of the transmission capacity.

In addition, the above intersections can also be formed in various optical waveguide devices such as optical waveguide devices using a semiconductor such as InP as a substrate and silicon photonics waveguide devices using Si as a substrate, as well as the LN substrates. Moreover, such optical waveguide devices may be various optical waveguide devices such as optical modulators using Mach-Zehnder optical waveguides, optical modulators using optical waveguides forming a directional coupler or a Y branch, or optical switches.

Then, the number of intersections on the substrate increases more and more when the optical waveguide pattern and the electrode pattern become complicated due to further miniaturization, multi-channelization, or high integration of the optical waveguide device, which may cause a non-negligible factor and limit the performance of the optical waveguide device.

As a technique for reducing the optical absorption loss due to the electrode metal formed on the optical waveguide, in the related art, a technique has been known in which a buffer layer made of an inorganic material such as $SiO_2$ is provided on the surface of the substrate on which the optical waveguide is formed, and the electrode metal is formed above the buffer layer (for example, Patent Literature No. 3). When this configuration is applied to an optical waveguide device composed of a convex optical waveguide, an intersection between the convex optical waveguide and the electrode can be configured as shown in FIG. 14.

FIG. 14 is a cross-sectional view of a substrate 1200 along the length direction of the high-frequency signal electrode 1206 formed on the substrate 1200. In FIG. 14, the high-frequency signal electrode 1206 intersects, for example, the four convex optical waveguides 1202a, 1202b, 1202c, and 1202d (hereinafter collectively referred to as convex optical waveguides 1202) extending in a direction orthogonal to the high-frequency signal electrode 1206 (the direction normal to the paper surface of FIG. 14) to form respective intersections 1204a, 1204b, 1204c, and 1204d (hereinafter collectively referred to as intersections 1204). The convex optical waveguides 1202a, 1202b, 1202c, and 1202d are configured by protruding portions 1208a, 1208b, 1208c, and 1208d (hereinafter collectively referred to as a protruding portion 1208) formed on the surface of the substrate 1200, respectively. A buffer layer 1210 made of SiO$_2$ is formed along the shape of the protruding portion 1208 on the substrate 1200, and a high-frequency signal electrode 1206 is formed thereon.

However, even if the buffer layer 1210 made of an inorganic material is provided on the substrate 1200, the unevenness of the upper and lower surfaces of the high-frequency signal electrode 1206 generated at the intersection with the convex optical waveguide 1202 is not alleviated, so that it is difficult to reduce signal propagation loss. Further, it is also conceivable to increase the thickness of the high-frequency signal electrode 1206 to reduce unevenness on the upper surface of the high-frequency signal electrode 1206 caused by the cross-sectional shape of the convex optical waveguide 1202, but there is a limit to reducing the unevenness on the upper surface within a practical thickness range, and the unevenness of the lower surface of the high-frequency signal electrode 1206 (the surface closer to the convex optical waveguide 1202) cannot be reduced at all, so that it cannot be a sufficiently effective countermeasure.

CITATION LIST

Patent Literature

[Patent Literature No. 1] Japanese Laid-open Patent Publication No. 2007-264548
[Patent Literature No. 2] Pamphlet of International Publication No. WO2018/031916
[Patent Literature No. 3] Japanese Laid-open Patent Publication No. 2009-181108

SUMMARY OF INVENTION

Technical Problem

In view of the above background, in an optical waveguide device having a plurality of intersections between convex optical waveguides and electrodes that propagate high-frequency electrical signals, it is desired to achieve good operating characteristics by reducing both the optical absorption loss of the optical waveguide and the signal propagation loss of the high-frequency signal electrode at the intersections.

Solution to Problem

One aspect of the present invention is an optical waveguide device including a substrate on which optical waveguides are formed, and an electrode that is formed on the substrate and has intersections crossing over the optical waveguides, in which the optical waveguides are configured by protruding portions extending on the substrate, and an intermediate layer made of a resin is provided at adjacent intersections along the electrode to fill spaces between the protruding portions along the electrode and covers tops of the protruding portions.

According to another aspect of the present invention, the intermediate layer has a strip shape along the electrode in plan view.

According to another aspect of the present invention, an upper surface of the intermediate layer is substantially flat in a range from a position of a top of the protruding portion closest to an edge of the intermediate layer to the edge.

According to another aspect of the present invention, a thickness of the intermediate layer measured from an upper surface of the protruding portion is greater than a height value of the protruding portion from a surface of the substrate.

According to another aspect of the invention, the intermediate layer may be formed of a plurality of layers.

According to another aspect of the present invention, the plurality of layers forming the intermediate layer includes one layer and another layer disposed above the one layer, and the one layer being made of a resin, the other layer is made of another resin having a higher viscosity when applied to the substrate than the resin forming the one layer.

According to another aspect of the present invention, the optical waveguides include two waveguide groups each composed of a plurality of the optical waveguides adjacent to each other, the electrode forms the intersections with respective optical waveguides of the two different waveguide groups, in each of the two waveguide groups, the intermediate layer is provided at the intersections adjacent along the electrode, and the intermediate layer of the two waveguide groups is configured as part of a continuous common layer that is strip-shaped in plan view and extends along the electrode to a space between the two waveguide groups.

According to another aspect of the invention, a buffer layer made of an inorganic material may be provided between the intermediate layer and the electrode.

According to another aspect of the present invention, a buffer layer made of an inorganic material may be provided between an upper surface of the protruding portion and the intermediate layer.

Another aspect of the present invention is an optical modulator including: the optical waveguide device according to any one of the above aspects, which is an optical modulation device that modulates light; a housing that houses the optical waveguide device; an optical fiber that inputs light to the optical waveguide device; and an optical fiber that guides light output by the optical waveguide device to outside the housing.

Another aspect of the present invention is an optical modulation module including: the optical waveguide device according to any one of the above aspects, which is an optical modulation device that modulates light; and a drive circuit that drives the optical waveguide device.

Yet another aspect of the present invention is an optical transmission apparatus including: the optical modulator or the optical modulation module; and an electronic circuit that generates an electrical signal for causing the optical waveguide device to perform a modulation operation.

This specification includes all the contents of Japanese Patent Application No. 2020-160537 filed on Sep. 25, 2020.

Advantageous Effects of Invention

According to the present invention, in an optical waveguide device having a plurality of intersections between convex optical waveguides and high-frequency signal electrodes that propagate high-frequency electrical signals, both the optical absorption loss of the optical waveguide and the signal propagation loss of the high-frequency signal electrode at the intersections are reduced, thereby achieving the good operating characteristics.

BRIEF DESCRIPTION OF DRAWINGS

FIG. 12 is a diagram illustrating a configuration of an optical modulation module according to a second embodiment of the present invention.

DESCRIPTION OF EMBODIMENTS

Hereinafter, embodiments of the present invention will be described with reference to the drawings.

1. First Embodiment

Figure 1:
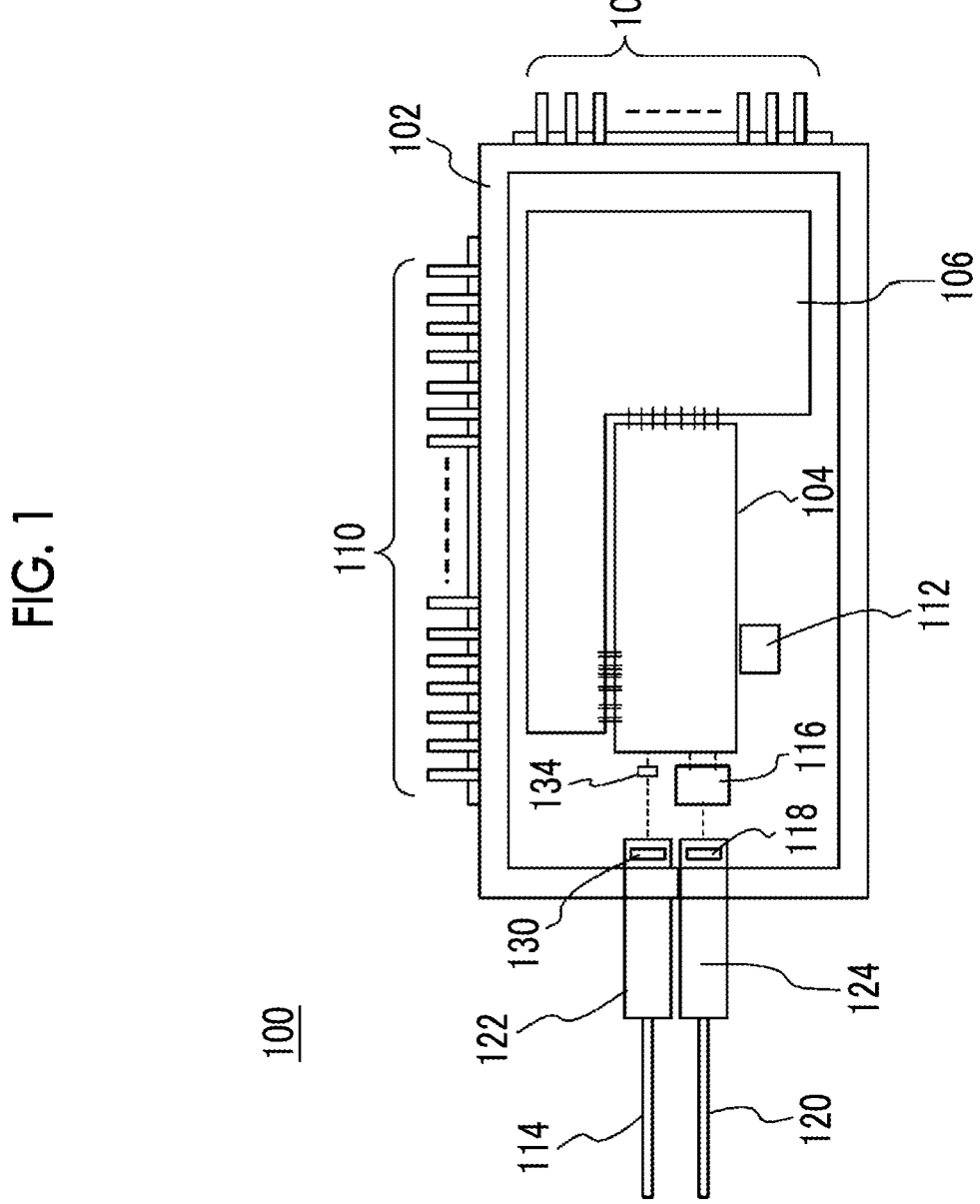
FIG. 1 is a diagram illustrating a configuration of an optical modulator according to a first embodiment of the present invention.

FIG. 1 is a diagram illustrating a configuration of an optical modulator 100 using an optical modulation device, which is an optical waveguide device according to a first embodiment of the present invention. The optical modulator 100 includes a housing 102, an optical modulation device 104 housed in the housing 102, and a relay substrate 106. The optical modulation device 104 is, for example, a configuration of a DP-QPSK modulator. Finally, a cover (not shown), which is a plate body, is fixed to the opening of the housing 102, and the inside of the housing 102 is hermetically sealed.

The optical modulator 100 has signal pins 108 for inputting a high-frequency electrical signal used for modulation of the optical modulation device 104, and signal pins 110 for inputting an electrical signal used for adjusting the operating point of the optical modulation device 104.

Further, the optical modulator 100 includes an input optical fiber 114 for inputting light into the housing 102 and an output optical fiber 120 for guiding the light modulated by the optical modulation device 104 to the outside of the housing 102 on the same surface of the housing 102.

Here, the input optical fiber 114 and the output optical fiber 120 are fixed to the housing 102 via the supports 122 and 124 which are fixing members, respectively. The light input from the input optical fiber 114 is collimated by the lens 130 disposed in the support 122, and then input to the optical modulation device 104 via the lens 134. However, this is only an example, and the input of light to the optical modulation device 104 may be performed by introducing, for example, the input optical fiber 114 into the housing 102 via the support 122, and connecting the end face of the introduced input optical fiber 114 to the end face of the substrate 230 (described later) of the optical modulation device 104, according to the related art.

The optical modulator 100 also has an optical unit 116 that polarizes and synthesizes two beams of modulated light output from the optical modulation device 104. The light after polarization synthesis, output from the optical unit 116, is collected by the lens 118 disposed in the support 124 and coupled to the output optical fiber 120.

The relay substrate 106 relays the high-frequency electrical signal input from the signal pins 108 and the electrical signal for adjusting an operating point input from the signal pins 110 to the optical modulation device 104, according to a conductor pattern (not shown) formed on the relay substrate 106. The conductor pattern on the relay substrate 106 is connected to a pad (described later) configuring one end of the electrode of the optical modulation device 104 by wire bonding or the like, for example. Further, the optical modulator 100 includes a terminator 112 having a predetermined impedance in the housing 102.

Figure 2:
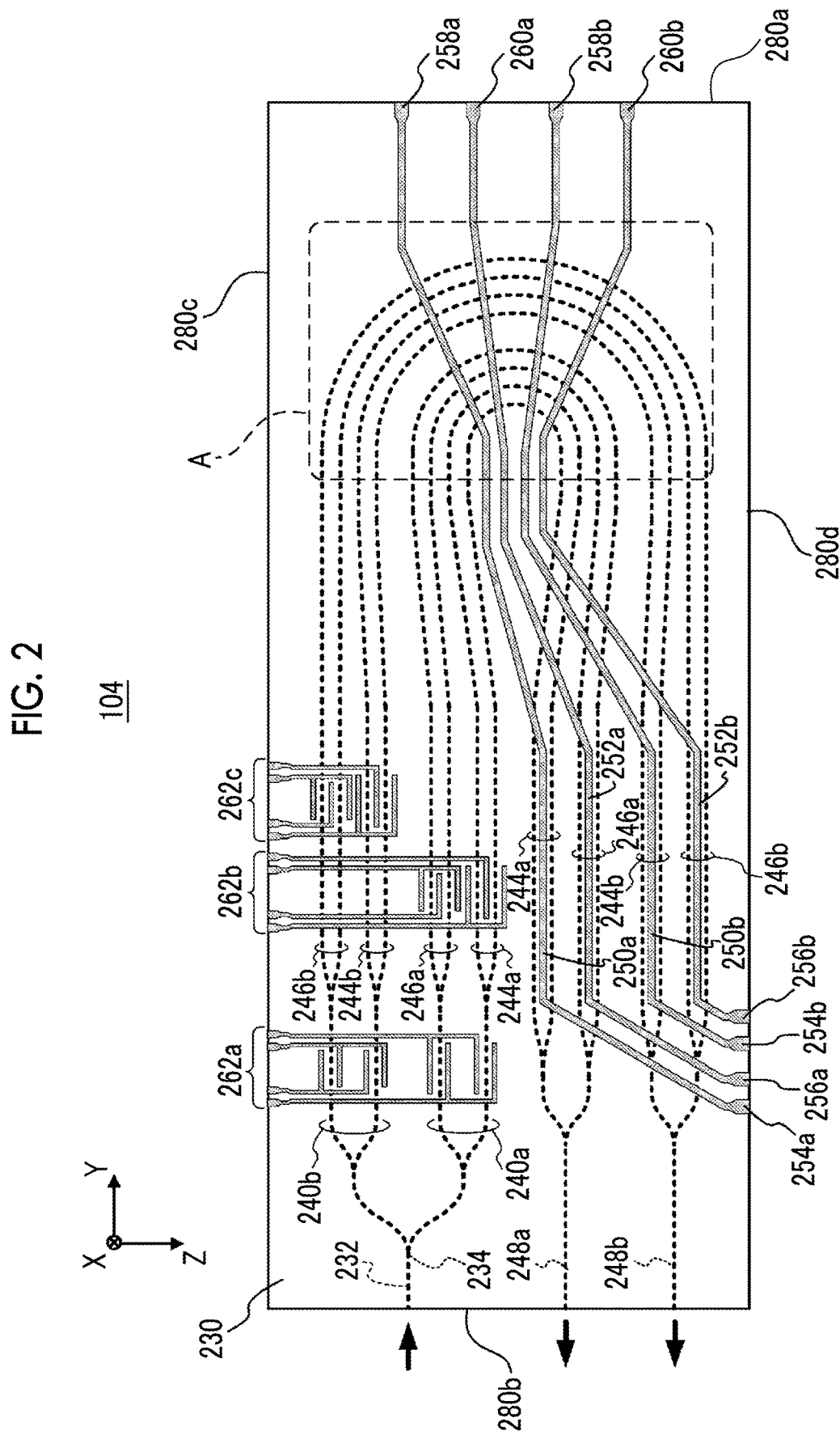
FIG. 2 is a diagram illustrating a configuration of an optical modulation device used in the optical modulator illustrated in FIG. 1.

FIG. 2 is a diagram illustrating an example of the configuration of the optical modulation device 104, which is housed in the housing 102 of the optical modulator 100 illustrated in FIG. 1. The optical modulation device 104 is composed of an optical waveguide (shown bold dotted line) formed on a substrate 230, and performs, for example, 200G DP-QPSK modulation. The substrate 230 is, for example, a thinned X-cut LN substrate having an electro-optic effect, which is processed to a thickness of 20 μm or less (for example, 2 μm). The optical waveguide is a convex optical waveguide (for example, a rib-type optical waveguide or a ridge optical waveguide) including a strip-shaped extending protruding portion formed on the surface of the thinned substrate 230. Here, since in the LN substrate, the refractive index can locally change due to the photoelastic effect when stress is applied, the LN substrate is generally adhered to a support substrate such as a silicon (Si) substrate, a glass substrate, or an LN substrate in order to reinforce the mechanical strength of the entire substrate. In the present embodiment, the substrate 230 is adhered to a support substrate 592 via the adhesive layer 590, as will be described later.

The substrate 230 is, for example, rectangular and has shown two left and right sides 280*a* and 280*b* extending in the shown vertical direction and facing each other, and shown upper and lower sides 280*c* and 280*d* extending in the shown left and right direction and facing each other. In FIG. 2, as illustrated by the coordinate axes illustrated in the shown upper left part, the normal direction toward the back of the paper surface of FIG. 2 (from the front surface to the rear surface) is the X direction, the shown right direction is the Y direction, and the shown lower direction is the Z direction. These coordinate axes correspond to, for example, the X-axis, Y-axis, and Z-axis, which are the crystal axes of the substrate 230, which is an LN substrate.

The optical modulation device 104 includes an input waveguide 232 that receives the input light (arrow pointing to the shown right) from the input optical fiber 114 on the shown upper side of the shown left side 280*b* of the substrate 230, and a branched waveguide 234 that branches the input light into two light beams having the same light amount. Further, the optical modulation device 104 includes a so-called nested Mach-Zehnder optical waveguides 240a and 240b, which are two modulation units for modulating each light branched by the branched waveguide 234.

The nested Mach-Zehnder optical waveguides 240a and 240b respectively include two Mach-Zehnder optical waveguides 244a, 246a and 244b, 246b respectively provided in two waveguide parts forming a pair of parallel waveguides. Thus, the nested Mach-Zehnder optical waveguides 240a and 240b perform QPSK modulation after folding the propagation direction of the input light branched into two beams by the branched waveguide 234 by 180 degrees, and then output the modulated light (output) from the respective output waveguides 248a and 248b to the shown left.

These two output light beams are then polarized and synthesized by an optical unit 116 disposed outside the substrate 230 and are combined into one light beam. Hereinafter, the input waveguide 232, the optical waveguides such as the branched waveguide 234, and the nested Mach-Zehnder optical waveguides 240a and 240b which are formed on the substrate 230 of the optical modulation device 104 and the Mach-Zehnder optical waveguides 244a, 246a, 244b, and 246b included in the nested Mach-Zehnder optical waveguides are collectively referred to as an optical waveguide 232 or the like. As described above, these optical waveguides 232 and the like are convex optical waveguides configured by protruding portions extending in a strip shape on the substrate 230.

On the substrate 230, high-frequency signal electrodes 250a, 252a, 250b, and 252b which respectively cause total four Mach-Zehnder optical waveguides 244a, 246a, 244b, and 246b configuring the nested Mach-Zehnder optical waveguides 240a and 240b to perform modulation operations and to which high-frequency electrical signals are input are provided. Here, the high-frequency electrical signals input to the high-frequency signal electrodes 250a, 252a, 250b, and 252b are electrical signals in the microwave band, and refer to electrical signals containing signal components of, for example, the G-band frequency or higher specified in the IEEE standard, specifically, 0.2 GHz or higher.

The shown right sides of the high-frequency signal electrodes 250a, 252a, 250b, and 252b extend to the shown right side 280a of the substrate 230 and are connected to pads 258a, 260a, 258b, and 260b. The shown left sides of the high-frequency signal electrodes 250a, 252a, 250b, and 252b are bent downward shown extend to the side 280d of the substrate 230, and are connected to pads 254a, 256a, 254b, and 256b.

The high-frequency signal electrodes 250a, 252a, 250b, and 252b form, for example, a coplanar transmission line having a predetermined impedance together with a ground conductor pattern (not illustrated) formed on the substrate 230, according to the related art. The ground conductor pattern is provided so as not to be formed on the optical waveguide 232 or the like, and the plurality of regions formed by dividing the ground conductor pattern by the optical waveguide 232 or the like can be connected to each other by wire bonding or the like.

The pads 258a, 260a, 258b, and 260b arranged on the shown right side 280a are connected to the relay substrate 106 by wire bonding or the like. The pads 254a, 256a, 254b, and 256b arranged on the shown lower side 280d are connected to four termination resistors (not shown) forming the terminator 112, respectively. Thus, the high-frequency electrical signals input from the signal pin 108 to the pads 258a, 260a, 258b, and 260b via the relay substrate 106 become traveling waves to propagate through the high-frequency signal electrodes 250a, 252a, 250b, and 252b, and modulate the light waves propagating through the Mach-Zehnder optical waveguides 244a, 246a, 244b, and 246b, respectively.

Here, the substrate 230 is formed in a thickness of 20 μm or less, preferably 10 μm or less, such that the interaction between the electric field formed in the substrate 230 by the high-frequency signal electrodes 250a, 252a, 250b, and 252b and the guided light propagating through the Mach-Zehnder optical waveguides 244a, 246a, 244b, and 246b is further strengthened to perform a high-frequency modulation operation at a lower voltage. In the present embodiment, for example, the thickness of the substrate 230 is 1.2 μm, and the height of the protruding portions forming the optical waveguide 232 and the like is 0.8 μm. In addition, the back surface (the surface facing the surface illustrated in FIG. 2) of the substrate 230 is adhered to a support substrate such as glass via an adhesive layer (not shown in FIG. 2, described as the adhesive layer 590 and the support substrate 592 in FIG. 5 and the like to be described later).

The optical modulation device 104 is also provided with bias electrodes 262a, 262b, 262c for adjusting the operating point by compensating for bias point fluctuations due to so-called DC drift. The bias electrode 262a is used to compensate for bias point fluctuations of the nested Mach-Zehnder optical waveguides 240a and 240b. Further, the bias electrodes 262b and 262c are used to compensate for bias point fluctuations of Mach-Zehnder optical waveguides 244a, 246a and 244b, 246b, respectively.

These bias electrodes 262a, 262b, and 262c each extend to the shown upper side 280 c of the substrate 230 and are connected to one of the signal pins 110 via the relay substrate 106. A corresponding signal pin 110 is connected to a bias control circuit provided outside the housing 102. Thus, the bias electrodes 262a, 262b, and 262c are driven by the bias control circuit, and the operating point is adjusted so as to compensate for fluctuations in the bias point of the corresponding each Mach-Zehnder optical waveguide. Hereinafter, the high-frequency signal electrodes 250a, 252a, 250b, and 252b are collectively referred to as the high-frequency signal electrodes 250a and the like. Further, the bias electrodes 262a, 262b, and 262c are collectively referred to as the bias electrode 262.

The bias electrode 262 is an electrode to which a direct current or low frequency electrical signal is applied, and are formed with a thickness in the range of 0.3 μm or more and 5 μm or less, for example, when the thickness of the substrate 230 is 20 μm. On the other hand, the high-frequency signal electrodes 250a, 252b, 250b, and 252b described above are formed in the range of 20 μm or more and 40 μm or less, for example, in order to reduce the conductor loss of the high-frequency electrical signal to be applied. The thickness of the high-frequency signal electrode 250a and the like is determined according to the thickness of the substrate 230 in order to set the impedance and microwave effective refractive index to desired values, and it can be determined thicker when the thickness of the substrate 230 is thick, and it can be determined to be thinner when the thickness of the substrate 230 is thin.

The optical modulation device 104 configured as described above includes many intersecting portions where the high-frequency signal electrodes 250a or the like or the bias electrode 262 cross (traverse) over the optical waveguide 232 or the like. As can be easily understood from the illustration of FIG. 2, the portions, in which in FIG. 2, the shown thick dotted lines indicating the optical waveguides 232 and the like and the shown strip-shaped portions indicating the high-frequency signal electrode 250a and the like or the bias electrode 262 intersect, are all intersecting portions in which the high-frequency signal electrode 250a or the like or the bias electrode 262 crosses over the optical waveguide 232 or the like. In the present embodiment, the optical modulation device 104 includes a total of 61 intersections between the optical waveguide 232 and the like and the high-frequency signal electrode 250a and the like.

Figure 3:
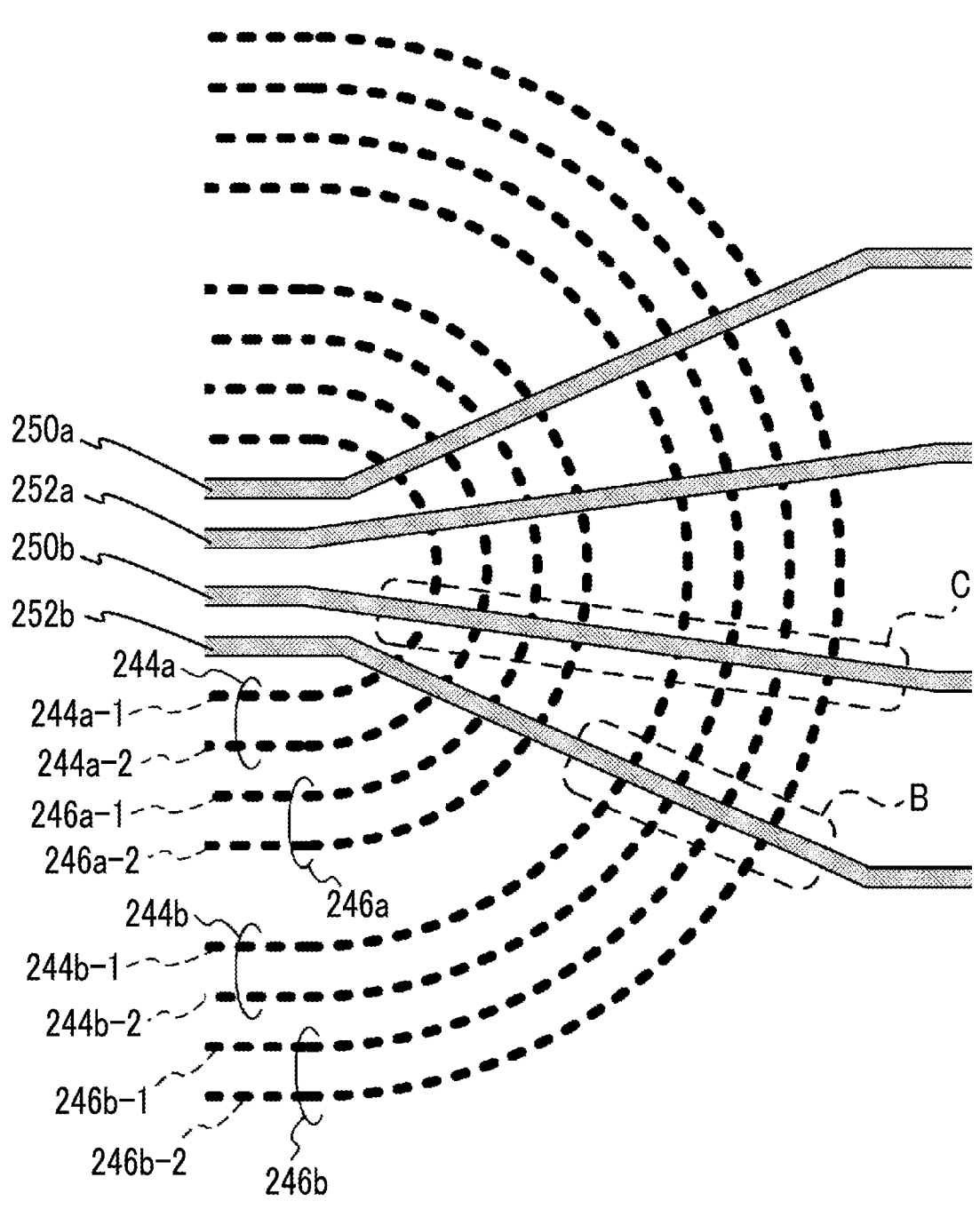
FIG. 3 is a partial detailed view of a part A of the optical modulation device illustrated in FIG. 2.

FIG. 3 is a partial detailed view of a part A of the optical modulation device 104 illustrated in FIG. 2.

Hereinafter, taking the parts B and C which are intersecting portions shown in FIG. 3 as an example, the configuration of these intersecting portions will be described. Here, as shown in FIG. 3, the Mach-Zehnder optical waveguide 244a includes two parallel waveguides 244a-1 and 244a-2, and the Mach-Zehnder optical waveguide 246a includes two parallel waveguides 246a-1 and 246a-2. Further, the Mach-Zehnder optical waveguide 244b includes two parallel waveguides 244b-1 and 244b-2, and the Mach-Zehnder optical waveguide 246b includes two parallel waveguides 246b-1 and 246b-2. The parallel waveguides 244a-1, 244a-2, 246a-1, 246a-2, 244b-1, 244b-2, 246b-1, and 246b-2 are also configured as convex optical waveguides.

[1-1. Configuration of Part B]

Figure 4:
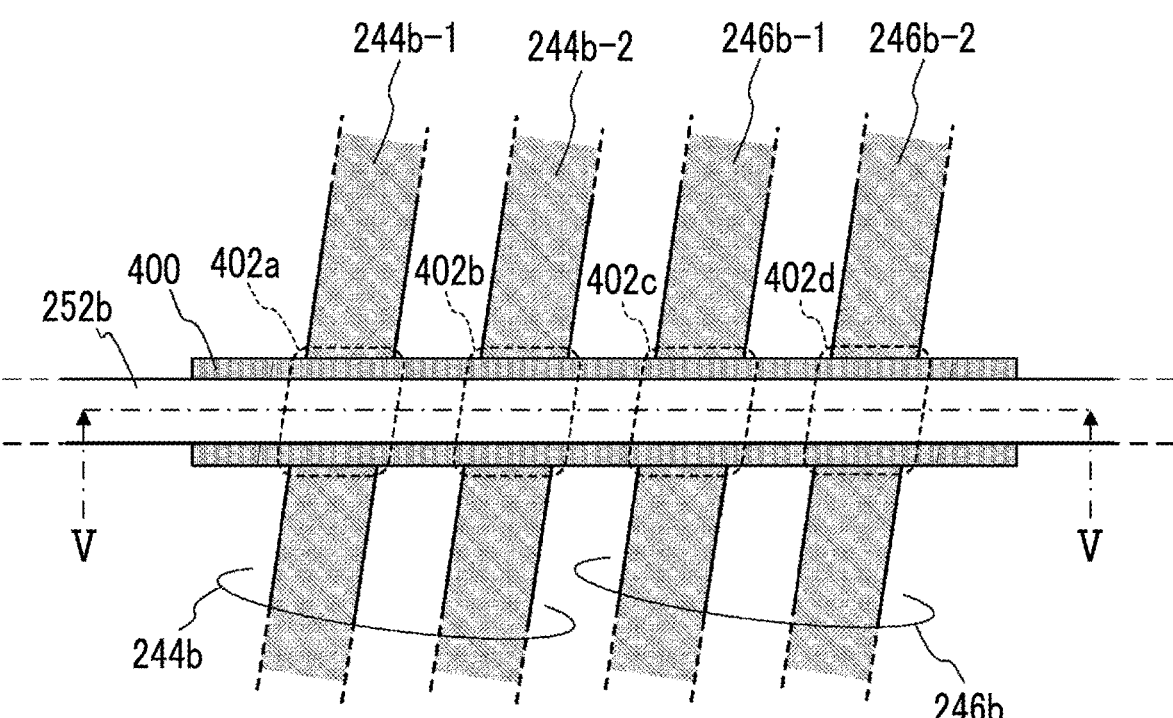
FIG. 4 is a plan view of a part B illustrated in FIG. 3.
Figure 5:
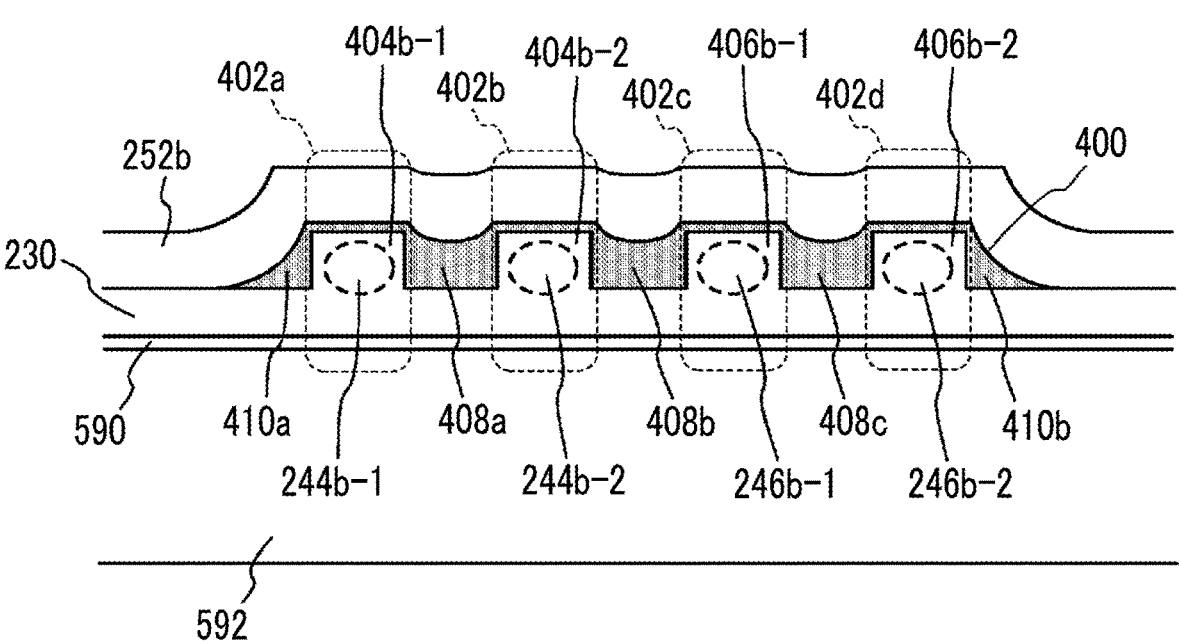
FIG. 5 is a cross-sectional view taken along line V-V of the part B illustrated in FIG. 4.

First, the configuration of the part B shown in FIG. 3 will be described as a first configuration example of the intersecting portion. FIGS. 4 and 5 are partial detailed views showing the configuration of a part B where the high-frequency signal electrode 252b crosses over the parallel waveguides 244b-1, 244b-2, 246b-1 and 246b-2. Here, FIG. 4 is a plan view of the part B, and FIG. 5 is a cross-sectional view taken along line V-V of the part B illustrated in FIG. 4.

The configurations illustrated in FIGS. 4, and 5 are examples of the configuration of the parts where the optical waveguide 232 and the like and the high-frequency signal electrode 250a and the like intersect each other in the optical modulation device 104, and these can be similarly used for any part where the optical waveguide 232 and the like and the high-frequency signal electrode 250a and the like intersect each other, other than the part B.

The high-frequency signal electrode 252b crosses over the parallel waveguides 244b-1, 244b-2, 246b-1 and 246b-2 to form intersections 402a, 402b, 402c and 402d, respectively. As shown in FIG. 5, the parallel waveguides 244b-1, 244b-2, 246b-1, and 246b-2 are convex optical waveguides respectively configured by protruding portions 404b-1, 404b-2, 406b-1, and 406b-2. In FIG. 5, the shown dotted ellipses drawn in the cross sections of the parallel waveguides 244b-1, 244b-2, 246b-1, and 246b-2 schematically represent guided light propagating through these parallel waveguides (in FIGS. 6 to 9 and 11 as well, the dotted-line ellipses indicate the guided light).

In addition, in FIG. 5, the substrate 230 is fixed to the support substrate 592 via the adhesive layer 590. Here, the adhesive layer 590 is made of, for example, a thermosetting resin, or the like, and the support substrate 592 is configured by, for example, a glass substrate, an LN substrate, a Si substrate, or the like.

In particular, in the present embodiment, as shown in FIG. 5, an intermediate layer 400 (shown hatched portion) made of a resin is provided at the adjacent intersections 402a,

402b, 402c, and 402d along the high-frequency signal electrode 252b and between the intersections to fill spaces between the protruding portions 404b-1, 404b-2, 406b-1, and 406b-2 along the high-frequency signal electrode 252b and covers top of the protruding portions. The resin forming the intermediate layer 400 can be a resin, such as a photoresist, which is cured after being applied to the substrate 230 in a viscous liquid state. In the present embodiment, the intermediate layer 400 extends to the shown left-side surface portion 410a of the protruding portion 404b-1 located at the shown left end, and to the shown right-side surface portion 410b of the protruding portion 406b-2 located at the shown right end.

In the part B of the optical modulation device 104 having the above configuration, the intermediate layer 400 is formed so as to fill the recess portions 408a, 408b, and 408c formed between the protruding portions 404b-1, 404b-2, 406b-1, and 406b-2 of the intersections 402a, 402b, 402c, and 402d adjacent along the high-frequency signal electrode 252b. Therefore, it is possible to reduce the occurrence of unevenness on the lower surface (surface on the substrate 230 side) and the upper surface of the high-frequency signal electrode 252b formed thereon. Thereby, in the part B of the optical modulation device 104, signal propagation loss such as radiation loss caused by the unevenness of the high-frequency signal electrode 252b can be reduced at the intersections 402a, 402b, 402c, and 402d.

In the part B of the optical modulation device 104, the intermediate layer 400 is formed so as to cover the top of the protruding portions 404b-1, 404b-2, 406b-1, and 406b-2, so that the optical absorption loss caused by the presence of the high-frequency signal electrode 252b can also be reduced in the parallel waveguides 244b-1, 244b-2, 246b-1, and 246b-2 formed by the protruding portions.

Therefore, in the optical modulation device 104, by applying a configuration similar to that of the part B to other intersections, both the optical absorption loss of the optical waveguide and the signal propagation loss of the high-frequency signal electrode at these intersections are reduced, thereby achieving good optical modulation characteristics.

Here, the thickness of the intermediate layer 400 measured from the upper surface of the protruding portions 404b-1, 404b-2, 406b-1, and 406b-2 is a thickness that can reduce the occurrence of optical absorption loss in the parallel waveguides 244b-1, 244b-2, 246b-1, and 246b-2 while improving the flatness of the upper surface of the intermediate layer 400 and reducing signal propagation loss caused by radiation loss or the like in the high-frequency signal electrode 252b, and can be as thin as possible. Thus, the amount of resin remaining on the substrate 230 is reduced while maintaining good electrical and optical characteristics, and the amount of gas released from the resin after the housing 102 is hermetically sealed can be reduced.

In particular, in the present embodiment, since the intermediate layer 400 is made of resin such as photoresist, for example, it is possible to easily adjust the degree of flatness of the upper surface of the resin when the recess portions 408a, 408b, and 408c are filled, and/or the adhesiveness of the resin on the side surface portions 410a and 410b, by adjusting the viscosity of the resin before curing.

As an example, the intermediate layer 400 can be formed by applying a photoresist having a viscosity of 100 cP or less to the surface of the substrate 230 on which the optical waveguide 232 and the like are formed by a spin coater so as to have a desired thickness covering the top of the protruding portions 404b-1 and the like, and by removing the photoresist of portions other than the portion where the high-frequency signal electrode 252*b* is formed by ordinary photolithography. By adjusting the number of rotations of the spin coater during application, the photoresist remains thick in the recess portions 408*a*, 408*b*, and 408*c* due to its viscosity and surface tension, and is thinly applied as it goes away from the side surface portions 410*a* and 410*b*.

In the present embodiment, the intermediate layer 400 is formed in a strip shape in plan view along the high-frequency signal electrode 252*b* (see FIG. 4). By forming the intermediate layer 400 in a strip shape along the high-frequency signal electrode 252*b* in this manner, the amount of resin remaining on the substrate 230 can be reduced, so that stable long-term operation as an optical modulator can be achieved, by reducing the amount of gas released from the resin after the housing 102 is hermetically sealed.

Next, modification examples of the part B of the optical modulation device 104 will be described.

[1-1-1. First Modification Example of Configuration of Part B]

Figure 6:
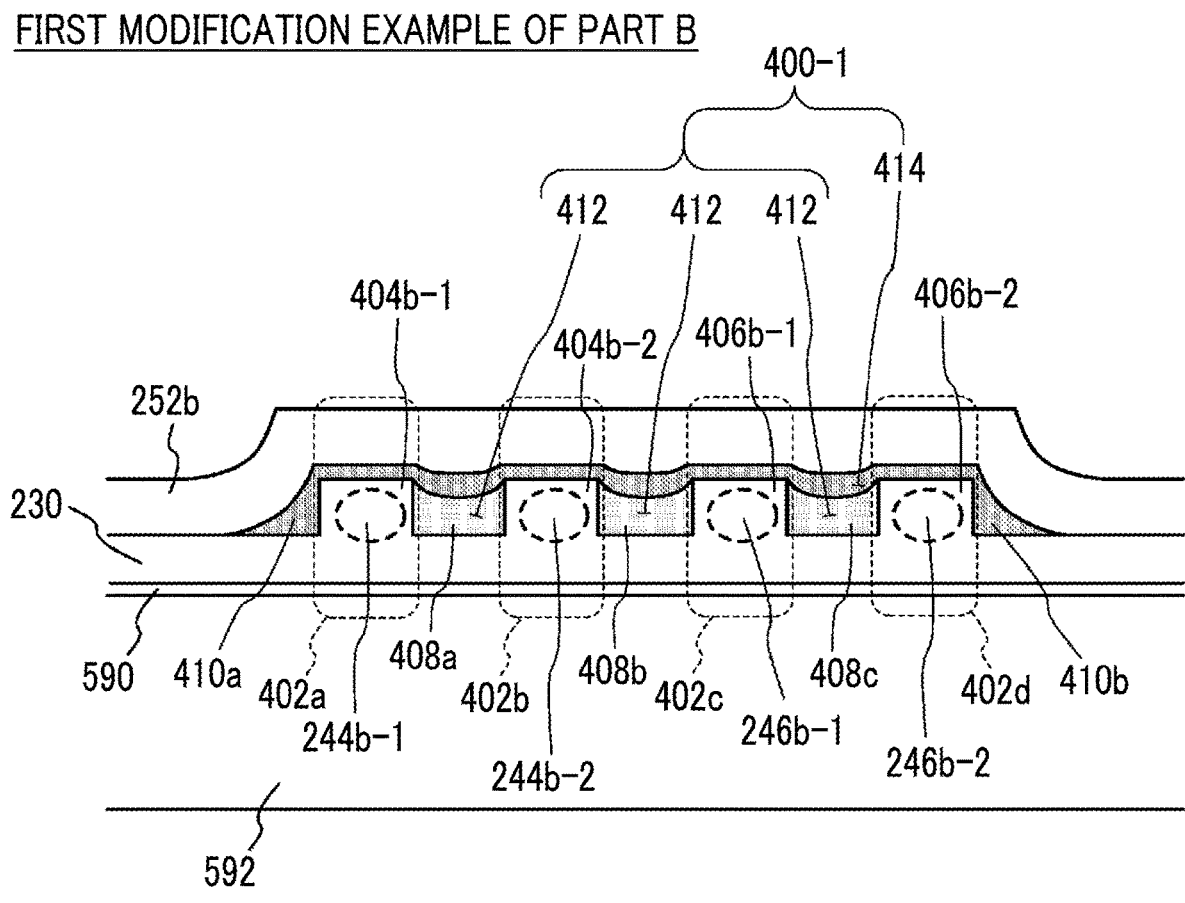
FIG. 6 is a first modification example of the configuration of the part B illustrated in FIG. 5.

First, a first modification example of the configuration of the part B will be described. FIG. 6 is a diagram showing the configuration of the part B according to the first modification example, and is a diagram corresponding to FIG. showing a cross-sectional view taken along line V-V in FIG. 4. In FIG. 6, for the same components as those shown in FIG. 5, the same reference numerals as those shown in FIG. 5 are used, and the above description for FIG. 5 is incorporated.

The configuration of the part B shown in FIG. 6 is the same as the configuration shown in FIG. 5, but differs in that an intermediate layer 400-1 is provided instead of the intermediate layer 400. The intermediate layer 400-1 has the same configuration as the intermediate layer 400, but is different in that the intermediate layer 400-1 is composed of two layers, that is, three first layers 412 that respectively fill the recess portions 408*a*, 408*b*, and 408*c* and the second layer 414 located on the top of the first layer 412 and the top of the protruding portions 404*b*-1, 404*b*-2, 406*b*-1, and 406*b*-2.

Here, the first layer 412 and the second layer 414 are, like the intermediate layer 400, a resin, such as a photoresist, which is cured after being applied to the substrate 230 in a viscous liquid state. The resins forming the first layer 412 and the second layer 414 may have different viscosities when applied to the substrate 230. For example, the second layer 414 may be made of another resin that has a higher viscosity when applied to the substrate 230 than the one resin forming the first layer 412.

Therefore, in the configuration of the part B shown in FIG. 6, for example, after filling and curing the recess portions 408*a*, 408*b*, and 408*c* with a first layer 412 that has low viscosity and good wettability when applied without gaps, by applying the second layer 414 having a higher viscosity and a higher surface tension than the first layer 412 when applied, the flatness of the upper surface of the second layer 414 can be improved as compared with the configuration shown in FIG. 5.

Therefore, in the configuration of the part B shown in FIG. 6, compared with the configuration shown in FIG. 5, the height (or depth) of the unevenness on the upper surface and the lower surface of the high-frequency signal electrode 252*b* generated at the intersections 402*a*, 402*b*, 402*c*, and 402*d* can be further reduced. As a result, it is possible to further reduce signal propagation loss such as radiation loss at the high-frequency signal electrode 252*b* caused by the unevenness, thereby achieving better optical modulation operation.

The configuration shown in FIG. 6 is effective, for example, when the heights of the protruding portions 404*b*-1, 404*b*-2, 406*b*-1, and 406*b*-2 are high or when the unevenness of the lower surface of the high-frequency signal electrode 252*b* cannot be sufficiently reduced in the single-layer intermediate layer 400 shown in FIG. 5 because the clearance between these protruding portions are wide. Further, the configuration shown in FIG. 6 is effective, for example, when optical absorption loss occurs because resin cannot be applied to a sufficient thickness between the upper surfaces of the protruding portions 404*b*-1, 404*b*-2, 406*b*-1, and 406*b*-2 and the lower surface of the high-frequency signal electrode 252*b* or when manufacturing variations occur due to the optical absorption loss that occurs.

The intermediate layer 400-1 having a two-layer structure as shown in FIG. 6 can be formed as follows. First, for example, a first layer 412 is formed by applying, curing, and patterning a resin having a viscosity of about 100 cP on the substrate 230 in the same manner as the intermediate layer 400 in FIG. 5 described above. After that, a second layer 414 is formed by applying, curing, and patterning a resin having a higher viscosity (for example, a viscosity of 200 cP or more) when applied than the resin of the first layer 412 to the substrate 230.

Note that the first layer 412 may be formed to roughly fill the recess portions 408*a*, 408*b*, and 408*c*, and the thickness thereof may be thicker or thinner than the heights of the protruding portions 404*b*-1, 404*b*-2, 406*b*-1, and 406*b*-2. That is, the first layer 412 may not be formed on the upper surfaces of the protruding portions 404*b*-1, 404*b*-2, 406*b*-1, and 406*b*-2 as shown in FIG. 6, and the first layer 412 may be formed up to the upper surfaces of these protruding portions.

The viscosities of the resins forming the first layer 412 and the second layer 414 when applied, and the number of rotations of the spin coater during application are adjusted such that the upper surface of the second layer 414 has a desired flatness, while the thickness of the intermediate layer 400-1 as a whole can be adjusted to be as thin as possible. Thus, the amount of resin remaining on the substrate 230 is reduced, and the amount of gas generated from the resin after the housing 102 is hermetically sealed is reduced, so that high long-term reliability of the optical modulator 100 can be ensured.

[1-1-2. Second Modification Example of Configuration of Part B]

Figure 7:
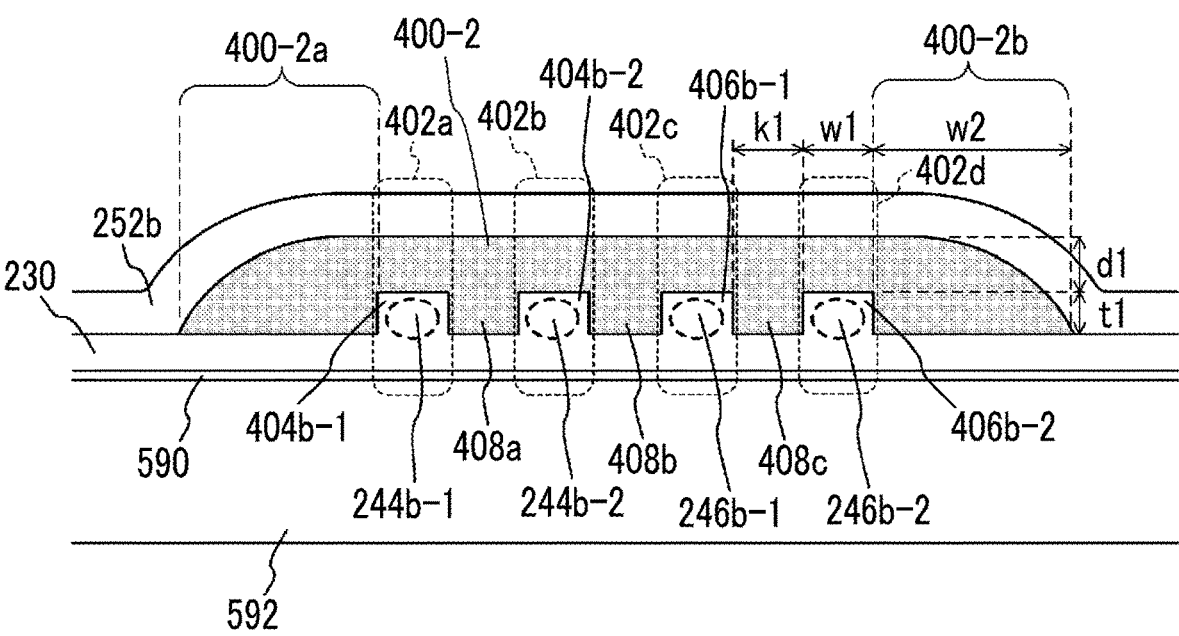
FIG. 7 is a second modification example of the configuration of the part B illustrated in FIG. 5.

Next, a second modification example of the configuration of the part B will be described. FIG. 7 is a diagram showing the configuration of the part B according to the second modification example, and is a diagram corresponding to FIG. showing a cross-sectional view taken along line V-V in FIG. 4. In FIG. 7, for the same components as those shown in FIG. 5, the same reference numerals as those shown in FIG. 5 are used, and the above description for FIG. 5 is incorporated.

The configuration of the part B shown in FIG. 7 is the same as the configuration shown in FIG. 5, but differs in that an intermediate layer 400-2 is provided instead of the intermediate layer 400. The intermediate layer 400-2 has the same configuration as the intermediate layer 400, but the upper surface of the intermediate layer 400-2 is configured as a bend-free surface (for example, a substantially flat surface) in the range from the position of the top of the protruding portions 404*b*-1 and 406*b*-2 that are closest to the shown left and right edges of the intermediate layer 400-2 to the edges closest thereto (shown edge range 400-2a, 400-2b).

In general, an electrode formed over a step on a substrate can cause signal propagation loss at the step portion. On the other hand, in the configuration of the part B shown in FIG. 7, since the edge ranges 400-2a and 400-2b of the intermediate layer 400-2 are composed of a bend-free surface (for example, a substantially flat surface), it is possible to reduce the signal propagation loss by reducing the radiation loss of the electrical signal in the high-frequency signal electrodes 252b formed in the edge ranges 400-2a and 400-2b. Therefore, in the configuration shown in FIG. 7, compared to the configurations shown in FIGS. 5 and 6, by increasing the thickness of the intermediate layer 400-2 while reducing signal propagation loss, it is possible to further reduce the unevenness generated on the upper surface of the intermediate layer 400-2 or the lower surface of the high-frequency signal electrode 252b due to the presence of the protruding portions 404b-1, 404b-2, 406b-1, and 406b-2.

In terms of reduction of signal propagation loss such as radiation loss in the high-frequency signal electrode 252b by reducing unevenness generated on the upper surface of the intermediate layer 400-2 due to the presence of the protruding portions 404b-1, 404b-2, 406b-1, and 406b-2, the thickness d1 of the intermediate layer 400-2 measured from the upper surface of the protruding portions 404b-1, 404b-2, 406b-1, and 406b-2 is preferably greater than the value of height t1 of these protruding portions measured from the surface of substrate 230 (that is, d1>t1).

Such a thick intermediate layer 400-2 can be easily constructed using, for example, a resist that has a relatively high viscosity (for example, greater than 200 cP) when applied to the substrate 230. Further, the bend-free (for example, substantially flat) upper surface of the intermediate layer 400-2 in the edge ranges 400-2a, 400-2b can be formed by performing heat treatment at a relatively high temperature (for example, 200° C.) and/or at a high heating rate of 1° C./min or more (for example, 5° C./min) or by performing plasma asking, after curing and patterning the applied resist.

Further, the length w2 of the edge range 400-2b is preferably greater than the sum of the width w1 of the protruding portion 406b-2 closest to the edge range 400-2b and the clearance between the protruding portion 406b-2 and the protruding portion 406b-1 adjacent thereto (accordingly, the width of the recess portion 408c) k1 (that is, w2>w1+k1). The same is true for the length of edge range 400-2a. Thus, the electrical signal propagating through the high-frequency signal electrode 252b can be prevented from fluctuating sharply in the vertical direction of the surface of the substrate 230, thereby further reducing signal propagation loss such as radiation loss.

In the configuration shown in FIG. 7, even when a plurality of optical waveguides 232 and the like are close to each other, and therefore the protruding portions forming these optical waveguides 232 and the like are arranged close to each other, the intermediate layer 400-1 is easily formed into a thick single layer to reduce the optical absorption loss and the signal propagation loss, which is advantageous both in terms of the manufacturing process and the manufacturing yield.

[1-2-3. Third Modification Example of Configuration of Part B]

Figure 8:
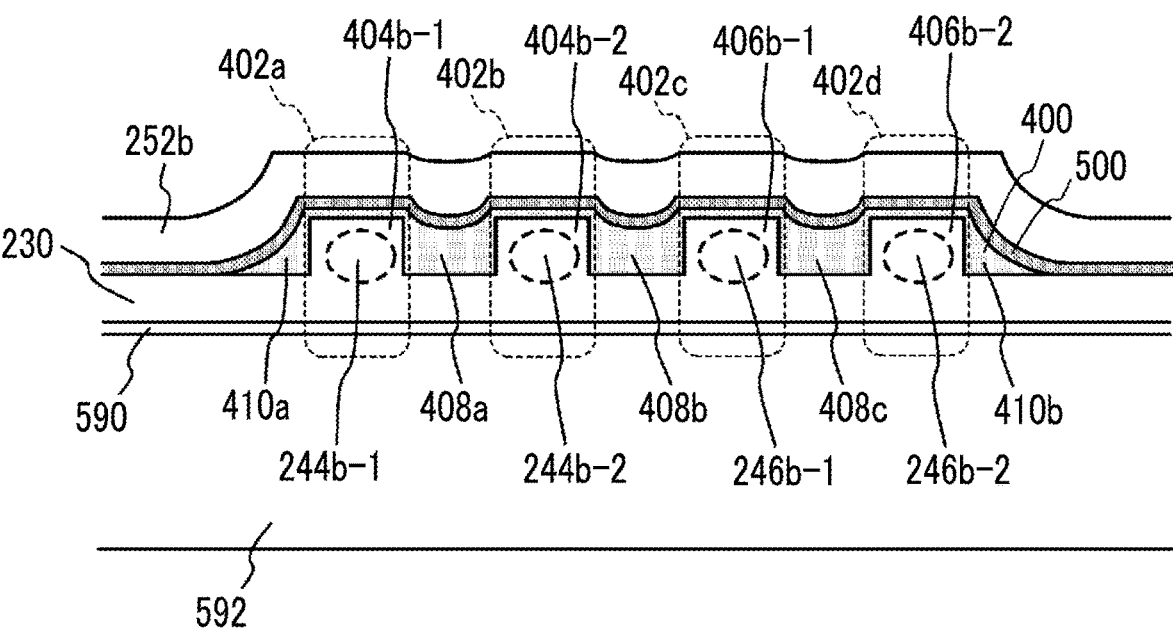
FIG. 8 is a third modification example of the configuration of the part B illustrated in FIG. 5.

Next, a third modification example of the configuration of the part B will be described. FIG. 8 is a diagram showing the configuration of the part B according to the third modification example, and is a diagram corresponding to FIG. showing a cross-sectional view taken along line V-V in FIG. 4. In FIG. 8, for the same components as those shown in FIG. 5, the same reference numerals as those shown in FIG. 5 are used, and the above description for FIG. 5 is incorporated.

The configuration of the part B shown in FIG. 8 is the same as the configuration shown in FIG. 5, but is different in that a buffer layer 500 made of an inorganic material is formed between the intermediate layer 400 and the high-frequency signal electrode 252b. In the present modification example, the inorganic material forming the buffer layer 500 is, for example, $SiO_2$.

In the configuration shown in FIG. 8, since the buffer layer 500 made of an inorganic material is formed between the protruding portions 404b-1, 404b-2, 406b-1 and 406b-2 forming the parallel waveguides 244b-1, 244b-2, 246b-1 and 246b-2 and the high-frequency signal electrode 252b, it is possible to improve the characteristics of the optical modulation device 104 and improve the degree of design freedom, by using the electrical characteristics and/or optical characteristics of the inorganic material.

For example, in the optical modulation device 104 of the present embodiment using the substrate 230 made of LN, the buffer layer 500 is made of $SiO_2$ with high electrical insulation as the inorganic material, so that it can be suitably applied to a design that requires a higher withstand voltage characteristic such as a narrow electrode interval and a high electric field being applied. In addition, since $SiO_2$ has a lower dielectric constant than LN forming the substrate 230, the speed of the light waves propagating through the parallel waveguides 244b-1, 244b-2, 246b-1, and 246b-2 and the speed of the high-frequency electrical signal propagating through the high-frequency signal electrode 252b are adjusted by forming the buffer layer 500 with $SiO_2$, thereby improving the degree of freedom in designing the high-frequency signal electrode 252b.

[1-1-4. Fourth Modification Example of Configuration of Part B]

Figure 9:
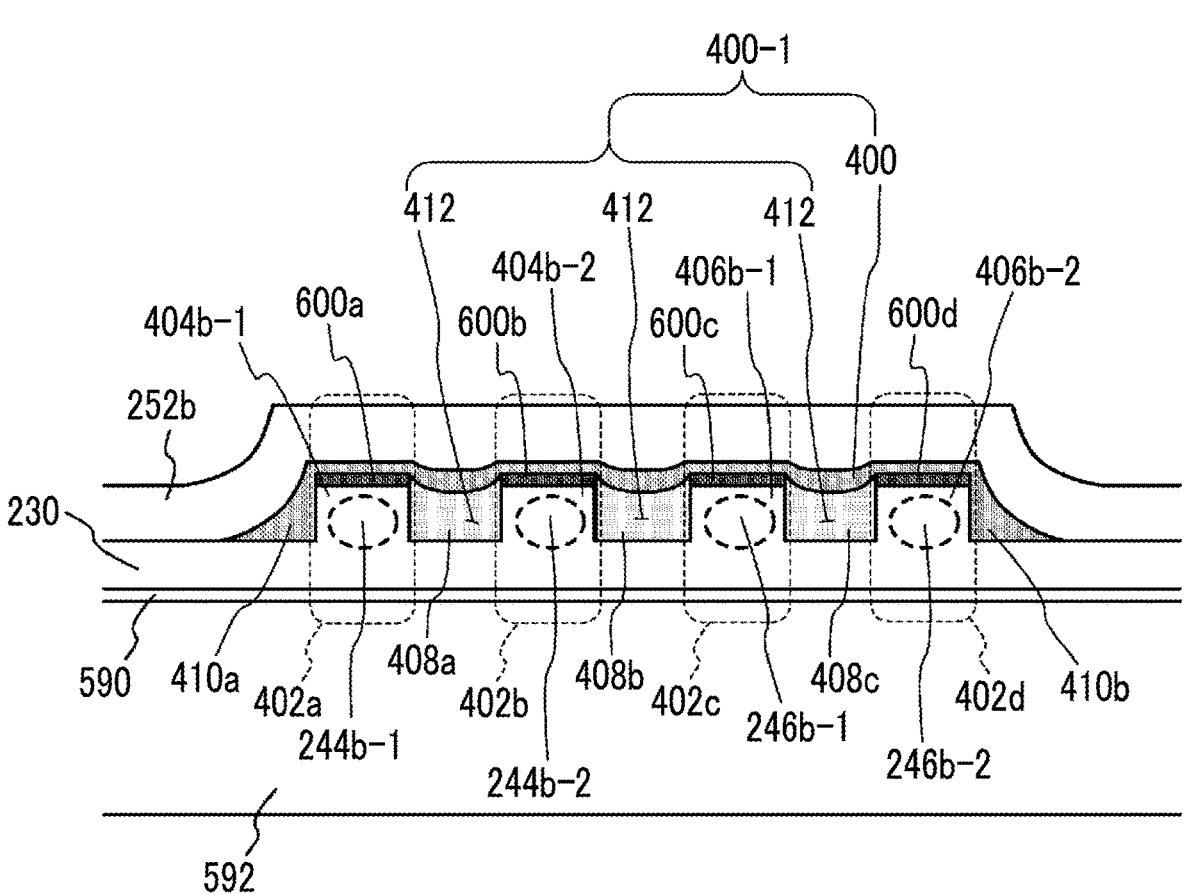
FIG. 9 is a fourth modification example of the configuration of the part B illustrated in FIG. 5.

Next, a fourth modification example of the configuration of the part B will be described. FIG. 9 is a diagram showing the configuration of the part B according to the fourth modification example, and is a diagram corresponding to FIG. showing a cross-sectional view taken along line V-V in FIG. 4. In FIG. 9, for the same components as those shown in FIGS. and 6, the same reference numerals as those shown in FIGS. and 6 are used, and the above description for FIGS. 5 and 6 is incorporated.

The configuration of the part B shown in FIG. 9 is the same as the configuration shown in FIG. 6, but is different in that buffer layers 600a, 600b, 600c, and 600d made of an inorganic material are formed between the upper surfaces of the protruding portions 404b-1, 404b-2, 406b-1, and 406b-2 and the intermediate layer 400-1. In the present modification example, the inorganic material forming the buffer layers 600a, 600b, 600c, and 600d is $SiO_2$.

In the configuration shown in FIG. 9, since the buffer layers 600a, 600b, 600c, and 600d made of inorganic materials are provided, it is possible to improve the characteristics of the optical modulation device 104 and improve the degree of design freedom by using the electrical characteristics and/or optical characteristics of the inorganic material, similar to the third modification example shown in FIG. 8.

In particular, in the configuration shown in FIG. 9, unlike the configuration shown in FIG. 8 in which the buffer layer 500 is provided over the entire top of the intermediate layer 400, buffer layers 600a, 600b, 600c and 600d are formed only on the top of the protruding portions 404b-1, 404b-2, 406b-1 and 406b-2, respectively. Therefore, in the configuration shown in FIG. 9, compared with the configuration in FIG. 8, by reducing stress from inorganic materials having high rigidity (for example, $SiO_2$) to be applied to the substrate 230, deterioration of the extinction ratio in the nested Mach-Zehnder optical waveguides 240a and 240b and the Mach-Zehnder optical waveguides 244a, 246a, 244b, and 246b due to deformation of the optical modulation device 104 and uneven distribution of stress on the substrate 230 can be reduced.

[1-2. Configuration of Part C]

Figure 10:
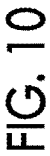
FIG. 10 is a plan view of a part C illustrated in FIG. 3.
Figure 11:
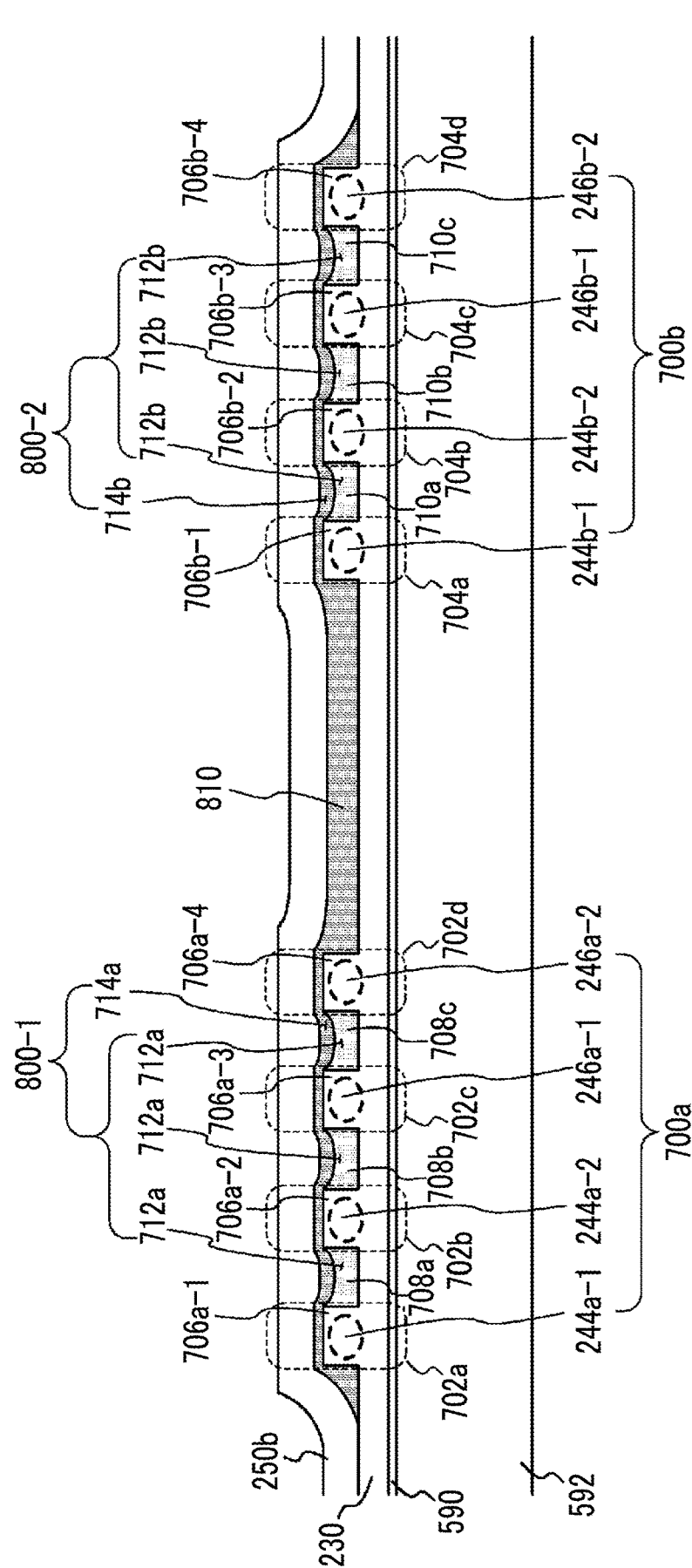
FIG. 11 is a cross-sectional view taken along line XI-XI of the part C illustrated in FIG. 10.

Next, the configuration of the part C shown in FIG. 3 will be described as a second configuration example of the intersecting portion. FIG. 10 is a plan view of part C, and FIG. 11 is a cross-sectional view taken along line XI-XI in FIG. 10. In the part C, as the optical waveguide 232 or the like, a waveguide group 700a composed of four parallel waveguides 244a-1, 244a-2, 246a-1, and 246a-2 adjacent to each other and a waveguide group 700b composed of four parallel waveguides 244b-1, 244b-2, 246b-1, and 246b-2 adjacent to each other are formed.

Here, the parallel waveguides 244a-1, 244a-2, 246a-1, and 246a-2 and the parallel waveguides 244b-1, 244b-2, 246b-1, and 246b-2 are all convex optical waveguides, and are respectively composed of protruding portions 706a-1, 706a-2, 706a-3, and 706a-4 and protruding portions 706b-1, 706b-2, 706b-3, and 706b-4. Hereinafter, the protruding portions 706a-1, 706a-2, 706a-3, and 706a-4 are collectively referred to as the protruding portion 706a, and the protruding portions 706b-1, 706b-2, 706b-3 and 706b-4 are collectively referred to as the protruding portion 706b.

In the part C, the high-frequency signal electrode 250b includes parallel waveguides 244a-1, 244a-2, 246a-1, and 246a-2 and parallel waveguides 244b-1, 244b-2, 246b-1, and 246b-2 belonging to two different waveguide groups 700a, 700b, and intersections 702a, 702b, 702c, 702d and 704a, 704b, 704c, 704d, respectively. Hereinafter, the intersections 702a, 702b, 702c, and 702d are collectively referred to as the intersection 702, and the intersections 704a, 704b, 704c, and 704d are collectively referred to as the intersection 704.

In the part C, the waveguide group 700a has an intermediate layer 800-1 between and on top of the protruding portions 706a of adjacent intersections 702 along the high-frequency signal electrode 250b, and the waveguide group 700b has an intermediate layer 800-2 between and on top of the protruding portions 706b of adjacent intersections 704 along the high-frequency signal electrode 250b.

In the part C, the intermediate layers 800-1 and 800-2 of the two waveguide groups 700a and 700b include one continuous common layer extending in a strip shape in plan view along the high-frequency signal electrode 250b.

Specifically, the intermediate layers 800-1 and 800-2 have the same configuration as the first modification example of the part B shown in FIG. 6. That is, the intermediate layer 800-1 is composed of two layers, that is, three first layers 712a that respectively fill three recess portions 708a, 708b, and 708c formed between four protruding portions 706a adjacent to each other, and the second layer 714a located on the top of the first layer 712a and the top of the four protruding portions 706a. Similarly, the intermediate layer 800-2 is composed of two layers, that is, three first layers 712b that respectively fill three recess portions 710a, 710b, and 710c formed between four protruding portions 706b adjacent to each other, and the second layer 714b located on the top of the first layer 712b and the top of the four protruding portions 706b.

Then, as shown in FIGS. 10 and 11, the second layer 714a of the intermediate layer 800-1 and the second layer 714b of the intermediate layer 800-2 are formed as part of a continuous common layer 810 that is strip-shaped in plan view and extends between the two waveguide groups 700a and 700b along the high-frequency signal electrode 250b.

Since in the part C having the above configuration, the second layer 714a and the second layer 714b are formed as part of the common layer 810, and the common layer 810 extends between the two waveguide groups 700a and 700b, the lower surface of the high-frequency signal electrode 250b does not descend to the surface of the substrate 230 at the position between the waveguide groups 700a and 700b, and can be maintained at approximately the same height as the protruding portions 706a and 706b.

Therefore, in the configuration of the part C described above, the vertical (normal direction of the surface of the substrate 230) fluctuation of the high-frequency electrical signal propagating through the high-frequency signal electrode 250b is also reduced even between the two waveguide groups 700a and 700b (that is, between the parallel waveguides 246a-2 and 244b-1), thereby further reducing the occurrence of signal propagation loss due to radiation loss or the like.

2. Second Embodiment

Next, a second embodiment of the present invention will be described. The present embodiment is an optical modulation module 1000 using the optical modulation device 104 included in the optical modulator 100 according to the first embodiment.

Figure 12:
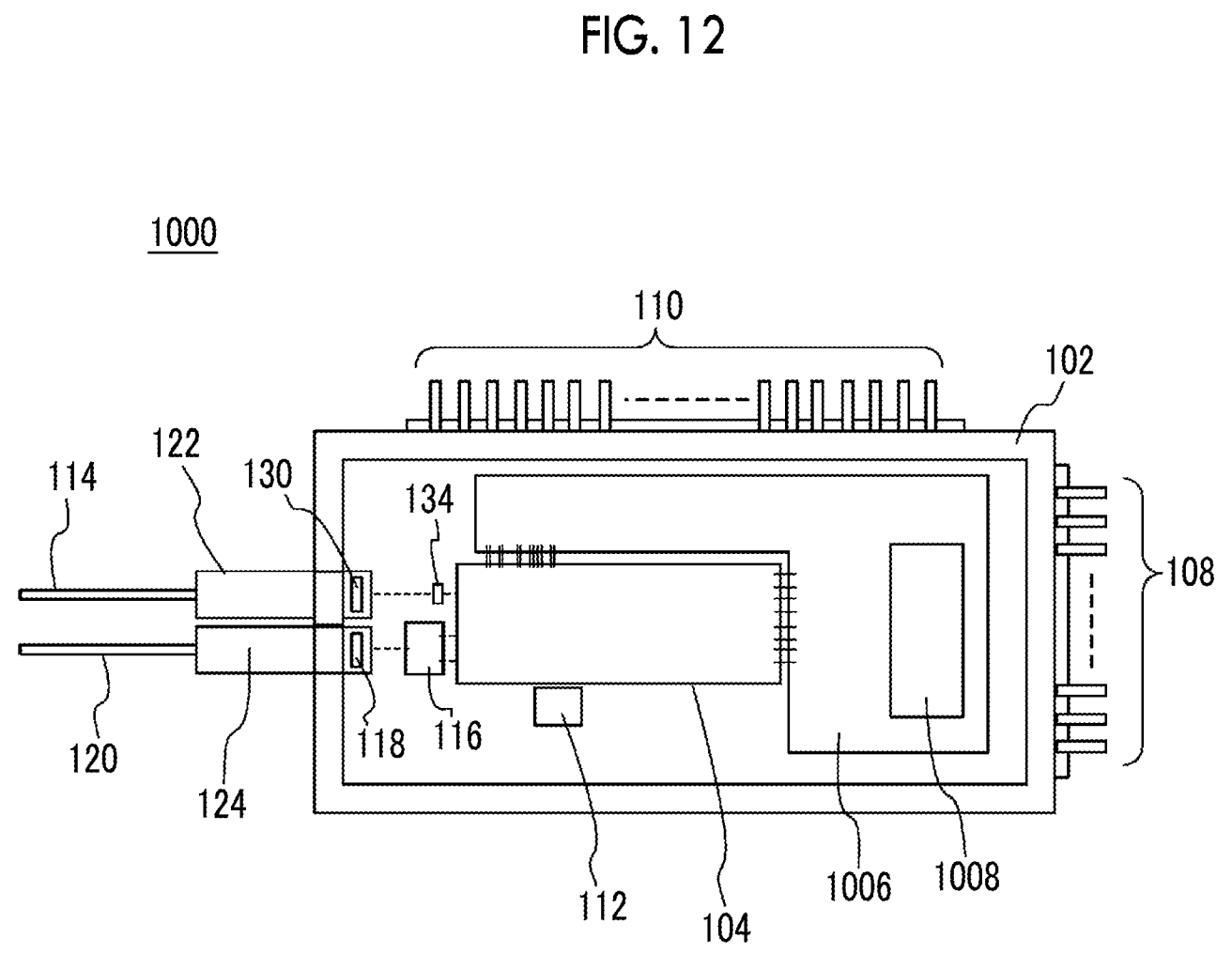

FIG. 12 is a diagram showing the configuration of an optical modulation module 1000 according to the present embodiment. In FIG. 12, for the same components as in the optical modulator 100 according to the first embodiment shown in FIG. 1, the same reference numerals as those shown in FIG. 1 are used, and the above description for FIG. 1 is incorporated.

The optical modulation module 1000 has the same configuration as the configuration of the optical modulator 100 illustrated in FIG. 1, but differs from the optical modulator 100 in that a circuit substrate 1006 is provided instead of the relay substrate 106. The circuit substrate 1006 includes a drive circuit 1008. The drive circuit 1008 generates a high-frequency electrical signal for driving the optical modulation device 104 based on, for example, a modulation signal supplied from the outside via the signal pins 108, and outputs the generated high-frequency electrical signal to the optical modulation device 104.

The optical modulation module 1000 having the above configuration includes the optical modulation device 104 having the configuration illustrated in FIGS. 4 to 11 at the portion in which the optical waveguide 232 and the like and the high-frequency signal electrode 250a and the like intersect, similarly to the optical modulator 100 according to the first embodiment described above. Therefore, in the optical modulation module 1000, as in the optical modulator 100, both the optical absorption loss of the optical waveguide 232 and the like and the signal propagation loss of the high-frequency signal electrode 250a and the like at the intersections are reduced, thereby achieving the good operating characteristics.

Third Embodiment

Figure 13:
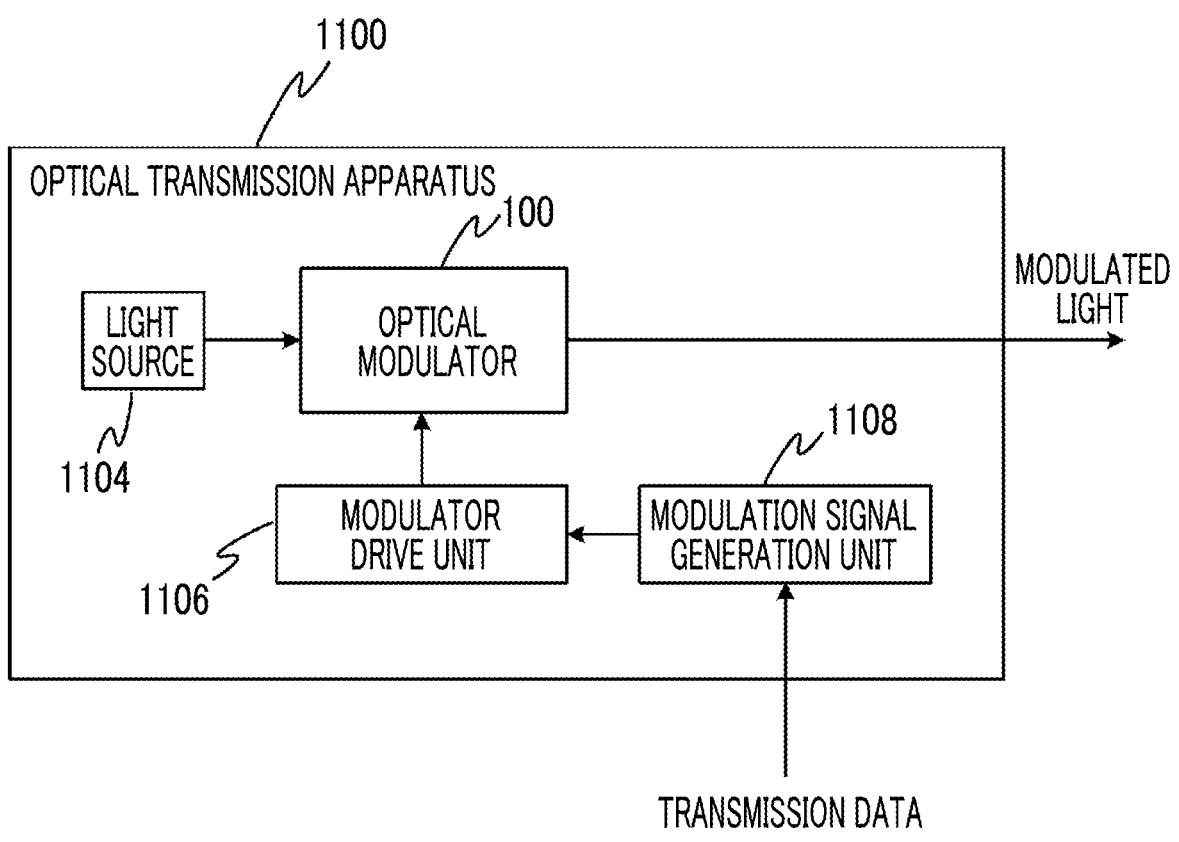
FIG. 13 is a diagram illustrating a configuration of an optical transmission apparatus according to a third embodiment of the present invention.
Figure 14:
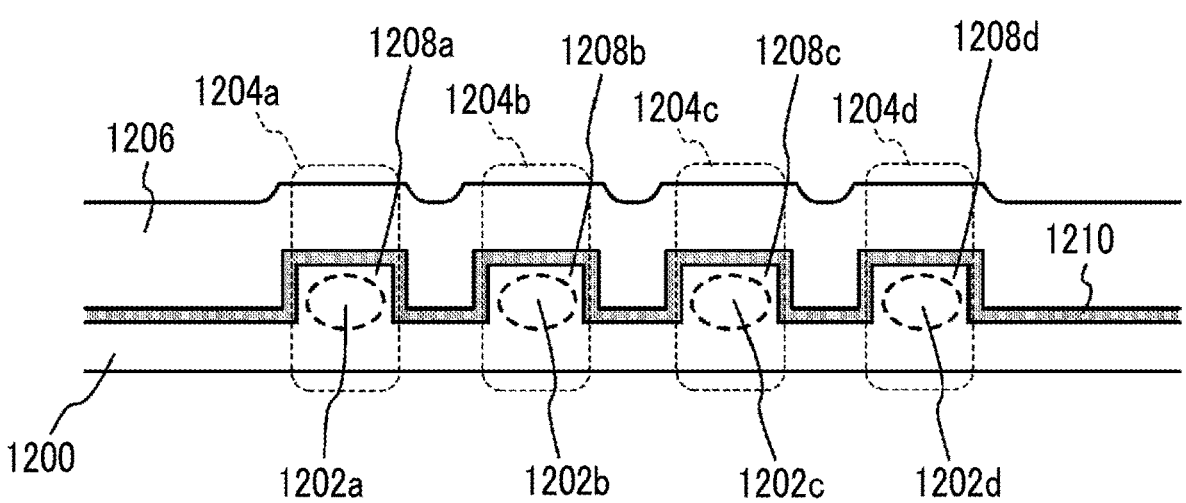
FIG. 14 is a diagram showing an example of a cross-sectional structure of an optical waveguide device in the related art.

Next, a third embodiment of the present invention will be described. The present embodiment is an optical transmission apparatus 1100 equipped with the optical modulator 100 according to the first embodiment. FIG. 13 is a diagram showing a configuration of an optical transmission apparatus 1100 according to the present embodiment. The optical transmission apparatus 1100 includes an optical modulator 100, a light source 1104 that inputs light to the optical modulator 100, a modulator drive unit 1106, and a modulation signal generation part 1108. The above-described optical modulation module 1000 can be used instead of the optical modulator 100 and the modulator drive unit 1106.

The modulation signal generation part 1108 is an electronic circuit that generates an electrical signal for causing the optical modulator 100 to perform a modulation operation, which generates, based on transmission data given from the outside, a modulation signal which is a high-frequency signal for causing the optical modulator 100 to perform an optical modulation operation according to the modulation data, and outputs the modulation signal to the modulator drive unit 1106.

The modulator drive unit 1106 amplifies the modulation signal input from the modulation signal generation part 1108 and outputs four high-frequency electrical signals for driving four high-frequency signal electrodes 250a, 252a, 250b, and 252b of the optical modulation device 104 included in the optical modulator 100. As described above, instead of the optical modulator 100 and the modulator drive unit 1106, for example, the optical modulation module 1000 provided with a drive circuit 1008 including a circuit corresponding to the modulator drive unit 1106 inside the housing 102 can also be used.

The four high-frequency electrical signals are input to the signal pins 108 of the optical modulator 100 to drive the optical modulation device 104 and the like. Thus, the light output from the light source 1104 is, for example, DP-QPSK modulated by the optical modulator 100 to become modulated light, and is output from the optical transmission apparatus 1100.

In particular, in the optical transmission apparatus 1100, as in the optical modulator 100 according to the first embodiment described above, the optical modulator 100 or the optical modulation module 1000 including the optical modulation device 104 having the configurations shown in FIGS. 4 to 11 at the portion where the optical waveguide 232 or the like and the high-frequency signal electrode 250a or the like intersect is used, so that good modulation characteristics can be achieved, and good optical transmission can be performed.

The present invention is not limited to the configuration of the above embodiment and its alternative configuration, and can be implemented in various embodiments without departing from the gist thereof.

For example, in the above-described first embodiment, the configuration of the intersections between the high-frequency signal electrode 250a and the like and the optical waveguide 232 and the like has been described by using the part B and the part C shown in FIG. 3 as an example, but the configurations shown in FIGS. 4 to 11 are applicable not only to the parts B and C, but also to any intersections between the high-frequency signal electrodes 250a and the like and the optical waveguides 232 and the like.

Further, in the first embodiment described above, the intersections between the high-frequency signal electrodes 250a and the like to which the high-frequency electrical signal is input and the optical waveguides 232 and the like have the configurations shown in FIGS. 4 to 11, but the electrodes to which the configurations are applied are not limited to the high-frequency signal electrode 250a and the like. For example, when a high-frequency signal such as a dither signal is applied to the bias electrode 262, the configurations shown in FIGS. 4 to 11 are applied to the intersections between the bias electrode 262 and the optical waveguides 232 or the like, thereby reducing optical absorption loss and signal propagation loss.

In addition, in the first modification example of the part B shown in FIG. 6, the intermediate layer 400-1 is composed of two layers of the first layer 412 and the second layer 414, but the intermediate layer can be composed of any number of plurality of layers. In this case, from the viewpoint of reducing unevenness on the electrode surface, among the plurality of layers, the layers farther from the substrate 230 are preferably made of a resin having a higher viscosity when applied.

Further, as easily understood by those skilled in the art, the combination of the features of the configurations shown in FIGS. 4 to 11 can be applied to any intersection between the optical waveguide 232 or the like and the high-frequency signal electrode 250a or the like and/or the bias electrode 262. For example, by combining the configuration of FIG. 6 with the configurations of FIG. 8 or 9, a buffer layer made of SiO$_2$ may be formed on the top of the second layer 414 of the intermediate layer 400-1 or the top of the protruding portion 404b-1 or the like.

Alternatively, in the configuration of FIG. 6, combining the configuration of FIG. 7, the second layer 414 formed after forming the first layer 412 may be formed such that the portions corresponding to the edge ranges 400-2a and 400-2b are formed of surfaces without bends, like the intermediate layer 400-2.

Alternatively, in the configurations shown in FIGS. 10 and 11, the intermediate layers 800-1 and/or 800-2 may have the same configuration as the intermediate layer 400 in FIG. 5 or the intermediate layer 400-2 in FIG. 7, and further, the buffer layer 500 as shown in FIG. 8, the buffer layer 600a as shown in FIG. 9, or the like may be provided.

Further, in the above-described embodiments, as an example of the optical waveguide device, the optical modulation device 104 formed of the substrate 230 of LN (LiNbO3) is shown, but without being limited to this, the optical waveguide device can be a device having any function (in addition to optical modulation, optical switch, optical directional coupler, or the like), which is formed of a substrate of any material (in addition to LN, InP, Si, or the like). Such devices can be, for example, so-called silicon photonic waveguide devices.

In the above-described embodiments, the substrate 230 is an X-cut (the normal direction of the substrate is the X-axis of the crystal axis) LN substrate (so-called X-plate) as an example, but a Z-cut LN substrate can also be used as the substrate 230. In an X-cut LN substrate and a Z-cut LN substrate, due to the different directions of electric fields applied to the Mach-Zehnder optical waveguides 244a, 244b, 246a, 246b, or the like, the arrangement of the high-frequency signal electrodes formed along these Mach-Zehnder optical waveguides 244a, 244b, 246a, 246b, or the like can be different from the high-frequency signal electrodes 250*a*, 250*b*, 252*a*, and 252*b* in the above embodiments. However, even when the substrate 230 is a Z-cut LN substrate, the intersection portions between the high-frequency signal electrodes and the optical waveguides 232 and the like can be configured in the same manner as in FIGS. 4 to 11.

As described above, the optical modulation device 104, which is an optical waveguide device configuring the optical modulator 100 according to the first embodiment described above, includes the substrate 230 on which the parallel waveguide 244*b*-1 or the like are formed, and the high-frequency signal electrode 252*b* formed on the substrate 230 and having an intersections 402*a* or the like crossing over the parallel waveguide 244*b*-1. The parallel waveguides 244*b*-1 and the like are configured by the protruding portions 404*b*-1 and the like extending on the substrate 230, and an intermediate layer 400 made of a resin is provided at the adjacent intersections 402*a* along the high-frequency signal electrode 252*b* to fill spaces between the protruding portions 404*b*-1 along the high-frequency signal electrode 252*b* and covers top of the protruding portions 404*b*-1.

According to this configuration, in an optical waveguide device having a plurality of intersections between convex optical waveguides and electrodes that propagate high-frequency electrical signals, the optical absorption loss of the optical waveguide and the signal propagation loss of the high-frequency signal electrode at the intersections are both reduced, thereby achieving good operating characteristics.

Further, in the optical modulation device 104, the intermediate layer 400 has a strip shape along the high-frequency signal electrode 252*b* in plan view. According to this configuration, since the amount of resin remaining on the substrate 230 can be reduced, the amount of gas released from the resin after the housing 102 is hermetically sealed is reduced, and a stable long-term operation as an optical modulator can be achieved.

Further, in the optical modulation device 104, like the intermediate layer 400-2, the upper surface of the intermediate layer may be composed of a bend-free surface (for example, a substantially flat surface) in the range from the position of the top of the protruding portion closest to the edge of the intermediate layer to the edge (for example, edge range 400-2*a* and/or 400-2*b*). According to this configuration, it is possible to reduce the signal propagation loss, by reducing the radiation loss of electrical signals in the high-frequency signal electrodes 252*b* formed in the edge ranges 400-2*a* and 400-2*b*. Further, since the thickness of the intermediate layer 400-2 can be increased while reducing the signal propagation loss, it is possible to further reduce the occurrence of unevenness on the upper surface of the intermediate layer 400-2 and the lower surface of the high-frequency signal electrode 252*b* caused by the presence of the protruding portions.

Further, the intermediate layer 400-2 has a thickness d1 measured from the upper surface of the protruding portion 406*b*-2, for example, is larger than the height value t1 of the protruding portion 406*b*-2 from the surface of the substrate 230. With this configuration, it is possible to effectively reduce the occurrence of unevenness on the upper surface of the intermediate layer 400-2 or the lower surface of the high-frequency signal electrode 252*b*.

Further, for example, the intermediate layer 400-1 is composed of a plurality of layers (for example, two layers of a first layer 412 and a second layer 414). The intermediate layer 400-1 also includes a first layer 412 and a second layer 414 disposed above the first layer 412, and the second layer 414 is made of another resin that has a higher viscosity when applied to the substrate 230 than the one resin forming the first layer 412. According to these configurations, after the recess portions 408*a*, 408*b*, and 408*c* are filled without gaps with the first layer 412 having low viscosity and good wettability when applied and cured, the second layer 414 having a higher viscosity and a higher surface tension than the first layer 412 when applied is applied, so that the flatness of the upper surface of the second layer 414 can be improved.

Further, the optical waveguides 232 and the like include, for example, two waveguide groups 700*a* and 700*b* each composed of a plurality of parallel waveguides adjacent to each other. The high-frequency signal electrode 250*b* forms an intersection with each of the parallel waveguides forming the waveguide groups 700*a* and 700*b*. The waveguide groups 700*a* and 700*b* have intermediate layers 800-1 and 800-2 at adjacent intersections along the high-frequency signal electrode 250*b*, respectively. The intermediate layers 800-1 and 800-2 of the waveguide groups 700*a* and 700*b* are configured as part of the common layer 810 of a strip shape in plan view that extends along the high-frequency signal electrode 250*b* to between the two waveguide groups 700*a* and 700*b*.

According to this configuration, at the intermediate position between the waveguide groups 700*a* and 700*b*, the lower surface of the high-frequency signal electrode 250*b* can be maintained at approximately the same height as the height of protruding portions 706*a* and 706*b* without descending to the surface of substrate 230 by common layer 810, so that even at the intermediate position, it is possible to reduce the fluctuation of the electrical signal propagating through the high-frequency signal electrode 250*b* in the direction normal to the substrate 230, thereby further reducing the occurrence of signal propagation loss due to radiation loss or the like.

Further, the optical modulation device 104 may have a buffer layer 500 made of an inorganic material, for example, between the intermediate layer 400 and the high-frequency signal electrode 252*b*. Further, the optical modulation device 104 can have a buffer layer 600*a* made of an inorganic material, for example, between the upper surface of the protruding portion 404*b*-1 and the intermediate layer 400-1.

According to these configurations, it is possible to improve the degree of freedom in designing the high-frequency signal electrode 252*b*, for example, by adjusting the speed of the light wave propagating through the parallel waveguide 244*b*-1 or the like, or the speed of the high-frequency electrical signal propagating through the high-frequency signal electrode 252*b*, due to the electrical and/or optical characteristics of the inorganic material.

Further, the optical modulation module 1000 according to the second embodiment includes an optical modulation device 104 that modulates light, which is an optical waveguide device, and a drive circuit 1008 that drives the optical modulation device 104.

Further, the optical transmission apparatus 1100 according to the third embodiment includes an optical modulator 100 or an optical modulation module 1000, and a modulation signal generation part 1108 which is an electronic circuit for generating an electrical signal for causing the optical modulation device 104 to perform a modulation operation.

According to these configurations, an optical modulator 100, an optical modulation module 1000, or an optical transmission apparatus 1100 having good characteristics can be achieved.

REFERENCE SIGNS LIST

100 Optical modulator
102 Housing
104 Optical modulation device
106 Relay substrate
108, 110 Signal pin
112 Terminator
114 Input optical fiber
116 Optical unit
118, 130, 134 Lens
120 Output optical fiber
122, 124 Support
230, 1200 Substrate
232 Input waveguide
234 Branched waveguide
240a, 240b Nested Mach-Zehnder optical waveguide
244a, 244b, 246a, 246b Mach-Zehnder optical waveguide
244a-1, 244a-2, 244b-1, 244b-2, 246a-1, 246a-2, 246b-1, 246b-2 Parallel waveguide
248a, 248b Output waveguide
250a, 250b, 252a, 252b High-frequency signal electrode
254a, 254b, 256a, 256b, 258a, 258b, 260a, 260b Pad
262, 262a, 262b, 262c Bias electrode
400, 400-1, 400-2, 800-1, 800-2 Intermediate layer
400-2a, 400-2b Edge range
402a, 402b, 402c, 402d, 702a, 702b, 702c, 702d, 704a, 704b, 704c, 704d, 1204a, 1204b, 1204c, 1204d Intersection
404b-1, 404b-2, 406b-1, 406b-2, 706a, 706a-1, 706a-2, 706a-3, 706a-4, 706b, 706b-1, 706b-2, 706b-3, 706b-4, 1208a,
1208b, 1208c, 1208d Protruding portion
408a, 408b, 408c, 708a, 708b, 708c, 710a, 710b, 710c Recess portion
410a, 410b Side surface portion
412, 712a, 712b First layer
414, 714a, 714b Second layer
500, 600a, 600b, 600c, 600d Buffer layer
590 Adhesive layer
592 Support substrate
700a, 700b Waveguide group
810 Common layer
1000 Optical modulation module
1006 Circuit substrate
1008 Drive circuit
1100 optical transmission apparatus
1104 Light source
1106 Modulator drive unit
1108 Modulation signal generation part
1202, 1202a, 1202b, 1202c, 1202d Convex optical waveguide
1206 High-frequency signal electrode
1210 Buffer layer

The invention claimed is:

1. An optical waveguide device comprising:
a substrate on which optical waveguides are formed; and
an electrode that is formed on the substrate and has intersections crossing over the optical waveguides, wherein
the optical waveguides are configured by protruding portions extending on the substrate,
the intersections include an intermediate layer between the optical waveguides and the electrode crossing over the optical waveguides,
the intermediate layer fills recess portions formed along the electrode and extending between the protruding portions of adjacent intersections of the intersections, and the intermediate layer is formed to have a thickness greater than a height of the protruding portions from a surface of the substrate so that the protruding portions and the intermediate layer filled in the recess portions are flat, and
the intermediate layer, under the electrode, has a strip shape along an extending direction of the electrode in plan view.

2. The optical waveguide device according to claim 1, wherein
an upper surface of the intermediate layer is substantially flat in a range from a position of a top of the protruding portion closest to an edge of the intermediate layer to the edge.

3. The optical waveguide device according to claim 2, wherein
a thickness of the intermediate layer measured from an upper surface of the protruding portion is greater than a height value of the protruding portion from the surface of the substrate.

4. The optical waveguide device according to claim 1, wherein
the intermediate layer is composed of a plurality of layers.

5. The optical waveguide device according to claim 4, wherein
the plurality of layers forming the intermediate layer includes one layer and another layer disposed above the one layer, and
the one layer being made of a resin, the other layer is made of another resin having a higher viscosity when applied to the substrate than the resin forming the one layer.

6. The optical waveguide device according to claim 1, wherein
the optical waveguides include two waveguide groups each composed of a plurality of the optical waveguides adjacent to each other,
the electrode forms the intersections with respective optical waveguides of the two different waveguide groups,
in each of the two waveguide groups, the intermediate layer is provided at the intersections adjacent along the electrode, and
the intermediate layer of the two waveguide groups is configured as part of a continuous common layer that is strip-shaped in plan view and extends along the electrode to a space between the two waveguide groups.

7. The optical waveguide device according to claim 1, wherein
a buffer layer made of an inorganic material is provided between the intermediate layer and the electrode.

8. The optical waveguide device according to claim 1, wherein
a buffer layer made of an inorganic material is provided between an upper surface of the protruding portion and the intermediate layer.

9. An optical modulator comprising:
the optical waveguide device according to claim 1, which is an optical modulation device that modulates light;
a housing that houses the optical waveguide device;
an optical fiber that inputs light to the optical waveguide device; and
an optical fiber that guides light output by the optical waveguide device to outside the housing.

10. An optical modulation module comprising:

the optical waveguide device according to claim 1, which is an optical modulation device that modulates light; and a drive circuit that drives the optical waveguide device.

11. An optical transmission apparatus comprising:

the optical modulator according to claim 9; and an electronic circuit that generates an electrical signal for causing the optical waveguide device to perform a modulation operation.

12. An optical transmission apparatus comprising:

the optical modulation module according to claim 11; and an electronic circuit that generates an electrical signal for causing the optical waveguide device to perform a modulation operation.

13. The optical waveguide device according to claim 1, wherein the intermediate layer is made of a resin.

\* \* \* \* \*